(12) United States Patent
Kondo et al.

(10) Patent No.: US 6,838,063 B2
(45) Date of Patent: Jan. 4, 2005

(54) HYDROGEN SUPPLY DEVICE

(75) Inventors: Yasuo Kondo, Okazaki (JP); Tadayoshi Terao, Toyoake (JP); Kiyoshi Kawaguchi, Toyama (JP); Masanori Uehara, Kariya (JP)

(73) Assignee: Denso Corporation, Kariya (JP)

( * ) Notice: Subject to any disclaimer, the term of this patent is extended or adjusted under 35 U.S.C. 154(b) by 383 days.

(21) Appl. No.: 09/971,010

(22) Filed: Oct. 5, 2001

(65) Prior Publication Data

US 2002/0040549 A1 Apr. 11, 2002

(30) Foreign Application Priority Data

| Oct. 6, 2000 | (JP) | ........................................ 2000-308034 |
| Dec. 26, 2000 | (JP) | ........................................ 2000-395525 |
| Jun. 22, 2001 | (JP) | ........................................ 2001-190312 |

(51) Int. Cl.$^7$ ........................ F23L 15/00; F28D 11/02; B01J 8/00
(52) U.S. Cl. ...................... 422/209; 422/190; 422/198; 48/127.9; 165/9; 165/DIG. 29
(58) Field of Search ............................ 48/127.9, 198.1, 48/198.3, 198.7, 211, 212, 214 R, 215, 214 A; 422/188–190, 198, 200, 201, 204, 206, 209, 211, 215, 202, 224; 165/6, 8, 9, 86, 88, 109.1, 120, 188, 186, 902, DIG. 16, DIG. 18, DIG. 28, DIG. 29, DIG. 135, DIG. 152

(56) References Cited

U.S. PATENT DOCUMENTS

| 3,211,148 | A | * | 10/1965 | Galajda, Jr. | .................... 422/46 |
| 4,025,612 | A | * | 5/1977 | Barber | ........................ 423/655 |
| 4,678,643 | A | * | 7/1987 | Fetzer | ......................... 422/175 |
| 5,145,011 | A | * | 9/1992 | Seike et al. | ..................... 165/9 |
| 5,234,048 | A | * | 8/1993 | Seike et al. | ..................... 165/9 |
| 6,013,385 | A | * | 1/2000 | DuBose | ....................... 429/17 |
| 6,565,999 | B1 | * | 5/2003 | Haogland | ..................... 429/26 |

FOREIGN PATENT DOCUMENTS

| JP | 62258994 A | * | 11/1987 |
| JP | 62261895 A | * | 11/1987 |
| JP | A-63-44931 | | 2/1988 |
| JP | A-2-160601 | | 6/1990 |
| JP | A-11-343101 | | 12/1999 |
| JP | A-2000-191304 | | 7/2000 |

OTHER PUBLICATIONS

U.S. patent application Ser. No. 09/942,122, Kondo et al., filed Aug. 30, 2001.

* cited by examiner

Primary Examiner—Kiley Stoner
Assistant Examiner—Kevin McHenry
(74) Attorney, Agent, or Firm—Posz & Bethards, PLC

(57) ABSTRACT

In the hydrogen supply device for producing and supplying hydrogen to a fuel cell, a reforming section has a rotary thermal storage through which low and high temperature passages pass. Reforming material is supplied to the low temperature fluid passage on an upstream side of the first rotary thermal storage. A combustion gas supply section for generating and supplying a combustion gas is located in the high temperature fluid passage on a downstream side of the first rotary thermal storage. With the hydrogen supply device mentioned above, the first rotary thermal storage rotates to move alternately between the low and high temperature fluid passages so that, in the reforming section, the reforming material flowing in the low temperature fluid passage is catalytically reformed to a reformed gas containing hydrogen upon receiving combustion heat of the combustion gas flowing in the high temperature fluid conduit.

34 Claims, 16 Drawing Sheets

HYDROGEN SUPPLY DEVICE

CROSS REFERENCE TO RELATED APPLICATION

This application is based upon and claims the benefit of priority of Japanese Patent Applications No. 2000-308034 filed on Oct. 6, 2000, No. 2000-395525 filed on Dec. 26, 2000 and No. 2001-190312 filed on Jun. 22, 2001, the contents of which are incorporated herein by reference.

BACKGROUND OF THE INVENTION

1. Field of the Invention

The present invention relates to a hydrogen supply device for producing hydrogen due to a reforming reaction of reforming material and supplying the produced hydrogen to a hydrogen consumption device.

2. Description of Related Art

Conventionally, a reforming apparatus, in which hydrogen rich gas is produced by reforming hydrocarbon compound, is well known as a device for supplying hydrogen to a fuel cell. In the reforming apparatus, the hydrogen is produced by reforming material containing hydrocarbon compound due to a catalytic reaction at high temperature (vapor steam reforming reaction). To perform the vapor steam reforming reaction, it is necessary to maintain the reforming apparatus at high temperature. A conventional method of maintaining the reforming apparatus at high temperature is to heat up the reforming apparatus in use of combustion heat based on combustion of unreacted gas (off gas containing hydrogen) emitted from the fuel cell.

As the reforming apparatus mentioned above, there is an apparatus as disclosed in JP-A-11-343101. This reforming apparatus has a combustion chamber and a reforming chamber which are separated by an isolation wall and heat is exchanged between the combustion chamber and the reforming chamber via the isolation wall. Combustion heat generated by burning fuel (off gas) in the combustion chamber causes to heat up the reforming chamber so that reforming material flowing in the reforming chamber is reformed to a gas containing hydrogen (reformed gas) under the help of a reforming catalyst in the reforming chamber.

However, since the combustion heat generated in the combustion chamber indirectly heats the reforming catalyst disposed in the reforming chamber through the isolation wall, heat resistance is larger and temperature increase is slower so that a start timing of the reforming reaction is retarded. Further, the conventional reforming apparatus has a drawback that a harmful ingredient such as unburned components in the combustion gas is exhausted into the atmosphere without being purified, in particular, at the starting time for activation. Furthermore, it is disadvantageous to apply the conventional reforming apparatus, which needs a relatively large heat transfer surface or body to secure a required amount of the heat transfer, to a vehicle whose installation space is limited.

Moreover, though the vapor steam reforming reaction, which is an endothermic reaction and needs heat from outside, is useful to obtain rich hydrogen, the conventional heat exchanger is not sufficient enough to supply the heat. Therefore, it is very common to use a partial oxidation reforming reaction (an exothermic reaction), in which air is added to the reforming material, simultaneously with the vapor steam reforming reaction.

However, oxygen in the air is used in the partial oxidation reforming reaction for having the reforming material reacted. Nitrogen gas contained in the air causes to dilute a density of hydrogen gas so that power generation efficiency of the fuel cell is lowered. Further, it has a drawback that an amount of gas passing through the passages for fuel reforming increases with higher flowing loss and a driving force for supplying the oxygen increases, too.

Further, the conventional device for producing hydrogen in the vapor steam reforming reaction is provided on a downstream side of a reforming section with a CO eliminating section in which CO is eliminated from the hydrogen rich gas. In the CO eliminating section, a shift reaction ($CO+H_2O \rightarrow H_2+CO_2$) and an oxidation reaction ($CO+\frac{1}{2}O_2 \rightarrow CO_2$) are performed. Since the shift reaction needs moisture (vapor steam), the reforming material tends to contain the moisture whose amount exceeds the amount necessary for the reforming reaction.

Therefore, a structure of the evaporation section for evaporating and vaporizing the reforming material is larger because the moisture whose amount exceeds the amount necessary for the reforming reaction has to be evaporated and vaporized. Further, the fuel cell, to which hydrogen is supplied, emits exhaust gas containing a large amount of moisture.

Moreover, the hydrogen rich gas, which is produced in the reforming section and supplied to the fuel cell, contains impurities other than hydrogen such as nitrogen and carbon dioxide. Accordingly, a density of hydrogen contained in the hydrogen rich gas is lower so that a power generation efficiency of the fuel cell is lower.

SUMMARY OF THE INVENTION

In view of the above-described problem, it is an object of the present invention to provide a hydrogen supply device, in which hydrogen produced from reforming material is supplied to a hydrogen consumption device, having a faster activation speed of reforming reaction at a starting time. Further, to provide a hydrogen supply device that exhausts a limited amount of harmful component of a hydrogen consumption device to the air is another object. Furthermore, it is a further object to provide a compact hydrogen supply device in which moisture is collected from exhaust gas of a hydrogen consumption device and supplied to a CO eliminating section. Moreover, a further object is to provide a compact hydrogen supply device in which impurities other than hydrogen contained in hydrogen rich gas produced in a reforming section is eliminated.

To accomplish the above-described objects, in the hydrogen supply device for producing and supplying hydrogen to a hydrogen consumption device, a reforming section has a first rotary thermal storage through which low and high temperature passages pass. The first rotary thermal storage has a rotating shaft about which the rotary thermal storage is driven to rotate. Reforming material is supplied to the low temperature fluid passage on an upstream side of the first rotary thermal storage. A combustion gas supply section for generating and supplying a combustion gas is located in the high temperature fluid passage on a downstream side of the first rotary thermal storage.

With the hydrogen supply device mentioned above, the first rotary thermal storage rotates to move alternately between the low and high temperature fluid passages so that, in the reforming section, the reforming material flowing in the low temperature fluid passage is catalytically reformed to a reformed gas containing hydrogen upon receiving combustion heat of the combustion gas flowing in the high temperature fluid conduit.

As mentioned above, the first rotary thermal storage is directly heated by high temperature fluid so that temperature thereof is effectively elevated with higher response characteristic. Accordingly, at a starting time of the device, the reforming reaction starts in a shorter time because the catalyst activates more rapidly.

Further, a heat transfer amount per a unit area is larger since the heat exchange between the high and low temperature fluid is not conducted through a conventional isolation wall interposed therebetween and a heat transfer surface itself is heated by the high temperature fluid. Accordingly, heat exchange efficiency is higher and the heat transfer surface for securing the required heat transfer amount is limited to a smaller area so that the device itself becomes more compact.

Preferably, a pair of first flanges are disposed in slidable contact with opposite axial ends of the first rotary thermal storage. Each of the first flanges is divided into two regions one of which communicates with the high temperature fluid passage and the other one of which communicates with the low temperature fluid passage. The first rotary thermal storage is provided inside with a plurality of first through holes extending axially. With this structure, the combustion gas, including off gas before catalytic combustion, flowing in the high temperature fluid passage passes through the first through-holes whose opening ends face to the one of two regions of the first flange, and the reforming material flowing in the low temperature fluid passage passes through the first through-holes whose opening ends face to the other one of two regions of the first flange.

It is preferable that the first rotary thermal storage is provided on surfaces of the first through holes with reforming catalyst.

The combustion gas supply section is provided, preferably, with a combustion fuel supply section for supplying combustion fuel and igniting means for igniting the combustion fuel to produce the combustion gas. As the combustion fuel supply section in which fuel for more rapidly activating the catalyst is supplied and ignited is integrated with the combustion gas supply section in which off gas is supplied, the device is more compact.

It is preferable that an evaporation section has a second rotary storage whose structure is similar to the first rotary thermal storage. The second rotary storage is disposed in the low temperature fluid passage on an upstream side of the first rotary thermal storage and in the high temperature fluid passage on a downstream side of the first rotary thermal storage. When the second rotary thermal storage rotates to move alternately between the low and high temperature fluid passages, the reforming material flowing in the low temperature fluid passage is heated and vaporized by the combustion heat of the combustion gas flowing in the high temperature fluid passage.

Preferably, the first and second rotary thermal storages have the same rotating shaft, or the first and second rotary thermal storages are integrated into one body to constitute a common rotary thermal storage.

The common rotary thermal storage may have a structure that a portion of the common rotary thermal storage on an upstream side of the low temperature fluid passage corresponds to the evaporation section and a portion of the common rotary thermal storage on a downstream side of the low temperature fluid passage corresponds to the reforming section or may have a structure that an identical portion of the common rotary thermal storage corresponds to both of the evaporation and reforming sections.

It is preferable that an exhaust purification section, which has an exhaust purification body provided with a plenty of exhaust through holes and oxidation catalyst affixed to surfaces of the exhaust through holes, is disposed in the high temperature fluid passage on a downstream side of the common rotary thermal storage. Oxidation catalyst serves to promote an oxidation reaction of surplus oxygen and unreacted components such as CO contained in the reformed gas. The exhaust purification section is further provided with heating means for heating the exhaust purification body for a purpose of faster activation of the catalyst and/or on an upstream side of the exhaust purification body with an adsorbent, which adsorbs harmful components even before the catalyst reaches activating temperature.

The hydrogen supply device is provided with a reformed gas passage through which the reformed gas produced in the reforming section passes, an exhaust gas passage through which exhaust gas containing hydrogen that is not sufficiently consumed in the hydrogen consumption device passes, and a third rotary thermal storage having a plenty of third through holes through which the reformed gas and exhaust gas passages pass. The third rotary thermal storage is driven to rotate and is provided on surfaces of the third through holes with adsorbent for adsorbing at least one of specified material contained in the reformed gas and the off gas.

With this structure, the third rotary thermal storage rotates to move alternately between the reformed gas and the exhaust gas passages so that the at least one of specified material adsorbed to the adsorbent in one of the reformed gas and exhaust gas passages drops out of the adsorbent in the other one of the reformed gas and exhaust gas passages.

Further, the third rotary thermal storage may constitute a CO eliminating section for catalytically eliminating CO from the reformed gas flowing in the reformed gas passage. The specified material may be moisture contained in the exhaust gas flowing in the exhaust gas passage so that the moisture, upon dropping out of the adsorbent in the reformed gas passage, is catalytically reacted with CO contained in the reformed gas due to shift reaction.

Furthermore, the specified material is nitrogen and/or carbon dioxide contained in the reformed gas flowing in the reformed gas passage. Accordingly, hydrogen density of the reformed gas becomes higher.

Moreover, the hydrogen supply device is provided with a reforming air passage through which the reforming air passes, an air moistening exhaust gas passage through which exhaust gas containing hydrogen that is not sufficiently consumed in the hydrogen consumption device passes, and a fourth rotary thermal storage having a plenty of fourth through holes through which the reforming air passage and the air moistening exhaust gas passage pass. The fourth rotary thermal storage is driven to rotate and is provided on surfaces of the fourth through holes with water adsorbent for adsorbing moisture.

With this structure, the fourth rotary thermal storage rotates to move alternately between the reforming air passage and the air moistening exhaust gas passage so that the fourth rotary thermal storage constitutes a reforming air moistening section in which moisture adsorbed to the water adsorbent in the air moistening exhaust gas passage drops out of the water adsorbent in the reforming air passage and is reused as the reforming air.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings.

DETAILED DESCRIPTION OF PREFERRED EMBODIMENT (First Embodiment)

Figure 1:
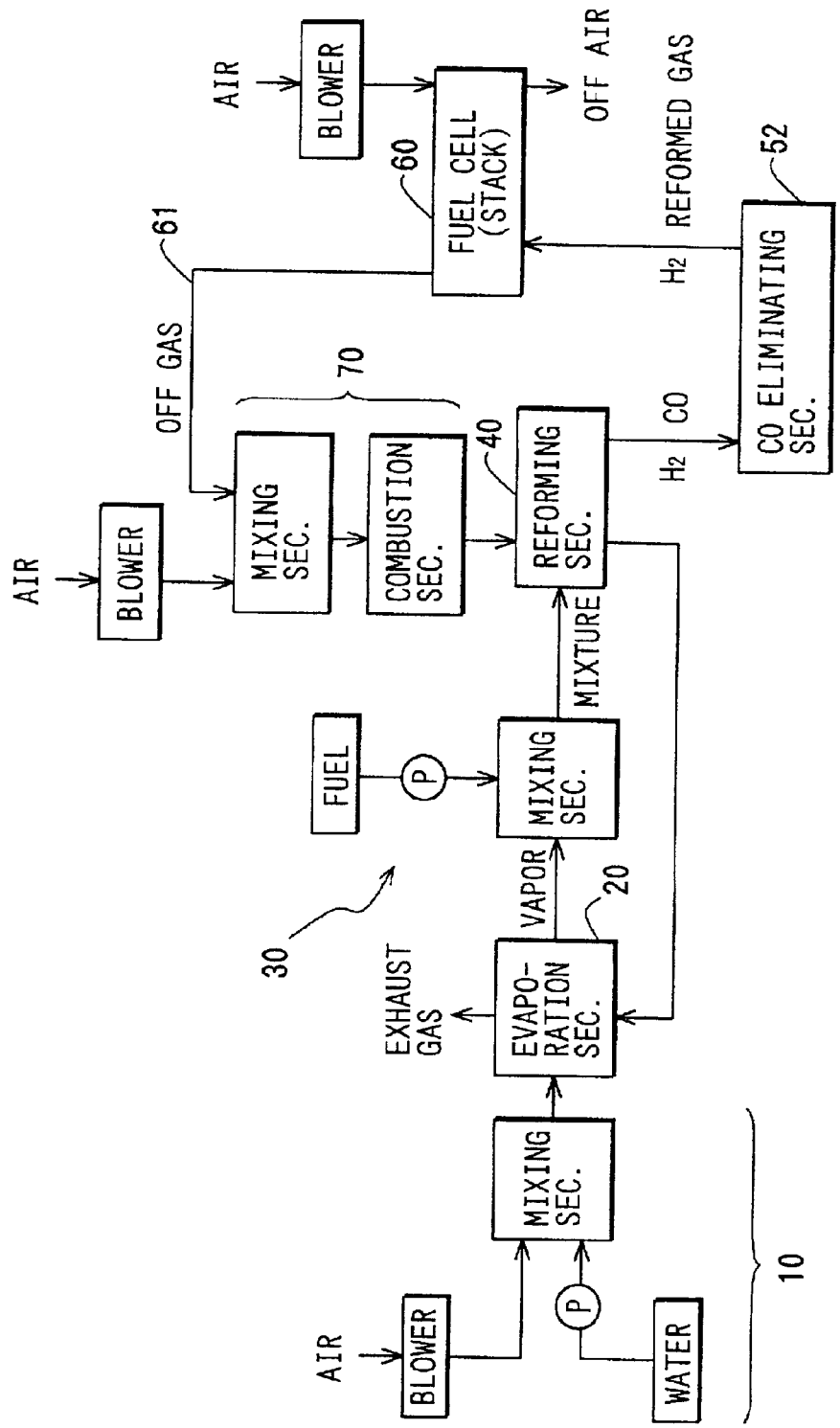
FIG. 1 is a block diagram illustrating a general structure of a hydrogen supply device according to first embodiment.
Figure 2:
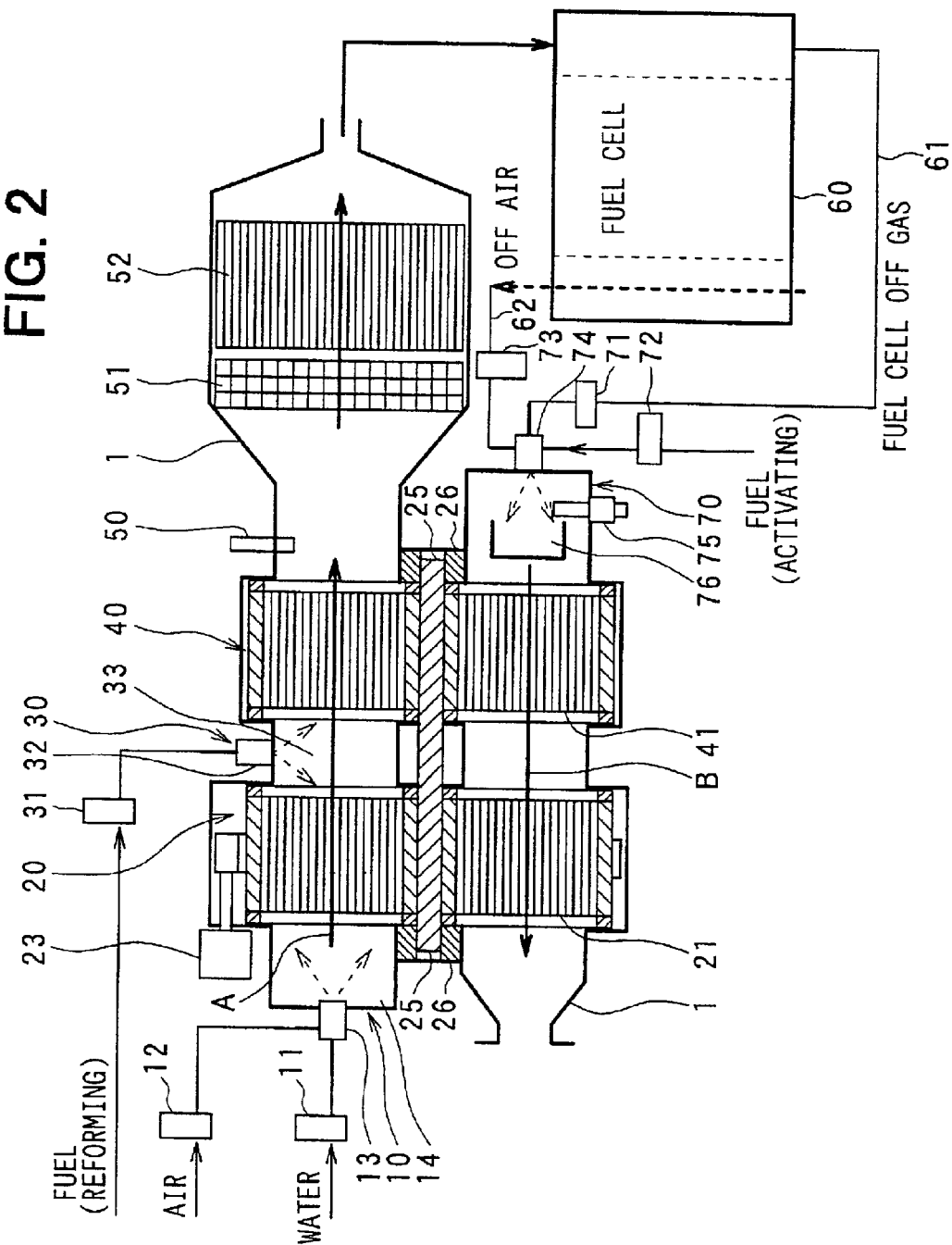
FIG. 2 is a conceptual diagram illustrating an arrangement of components of the hydrogen supply device of FIG. 1.

Referring to FIGS. 1 to 6, first embodiment of the present invention will be described. FIG. 1 is a block diagram illustrating a general structure of a hydrogen supply device according to first embodiment. FIG. 2 is a conceptual diagram illustrating an arrangement of components of the hydrogen supply device. The hydrogen supply device according to first embodiment supplies hydrogen to a fuel cell 60, which functions as a hydrogen consumption device.

As shown in FIGS. 1 and 2, the hydrogen supply device according to first embodiment includes a first reforming material supply section 10, an evaporation section 20 (heat exchange evaporation section), a second reforming material supply section 30, a reforming section 40 (heat exchange reforming section), a CO eliminating section 52, and a combustion gas supply section 70 (off gas supply section). Moreover, in the hydrogen supply device, a housing 1 forms a low temperature fluid passage A (a reforming material passage) for passing the reforming material and a high temperature fluid passage B (a combustion gas passage) for passing the combustion gas. The low temperature fluid passage A and the high temperature fluid passage B are parallel to each other. The low temperature fluid passage A and the high temperature fluid passage B are independent from each other, and the heat is exchanged through the evaporation section 20 and the reforming section 40.

In the low temperature fluid passage A, first reforming material (a mixture of water and air) supplied from the first reforming material supply section 10 is heated and evaporated (vaporized) at the evaporation section 20. Second reforming material (fuel) is mixed with the vaporized first reforming material at the second reforming supply section 30 to form reforming material containing water, air and reforming fuel. The reforming material is reformed at the reforming section 40 to a reformed gas containing $H_2$ and CO. After CO is eliminated at the CO eliminating section 52, it is supplied as a hydrogen rich gas to the fuel cell 60.

To the fuel cell 60, the air (oxygen) is supplied along with hydrogen so that power is generated due to an electrochemical reaction of hydrogen and oxygen. In the fuel cell 60, off gas containing unreacted hydrogen that has not been used for power generation is emitted.

In the high temperature fluid passage B, the off gas is supplied to the combustion gas supply section 70 through an off gas supply section 61 so that the off gas is burned to become the combustion gas. The combustion heat of the off gas heats up reforming catalyst at the reforming section 40. The combustion heat of the off gas is transferred via the evaporation section 20 to the reforming material flowing in the low temperature fluid passage A. In the present embodiment, liquid petroleum fuel such as gasoline and kerosene are used as the reforming fuel.

As shown in FIG. 2, the first reforming material supply section 10 for supplying the first reforming material (water and air) is placed at an upper-most stream part of the low temperature fluid passage A. The first reforming material supply section 10 is provided with a water flow rate control valve 11, an air flow rate control valve 12, a spray nozzle 13, and a mixing chamber 14. The water and air whose flow rates are controlled by the water flow rate control valve 11 and the air flow rate control valve 12, respectively, are sprayed from the spray nozzle 13 into the mixing chamber 14 so that a mixture of the water and air is produced.

On a downstream side of the first reforming material supply section 10 in the low temperature fluid passage A, the evaporation section 20 is disposed. The evaporation section 20 according to the first embodiment is a rotary type heat exchanger.

Figure 3:
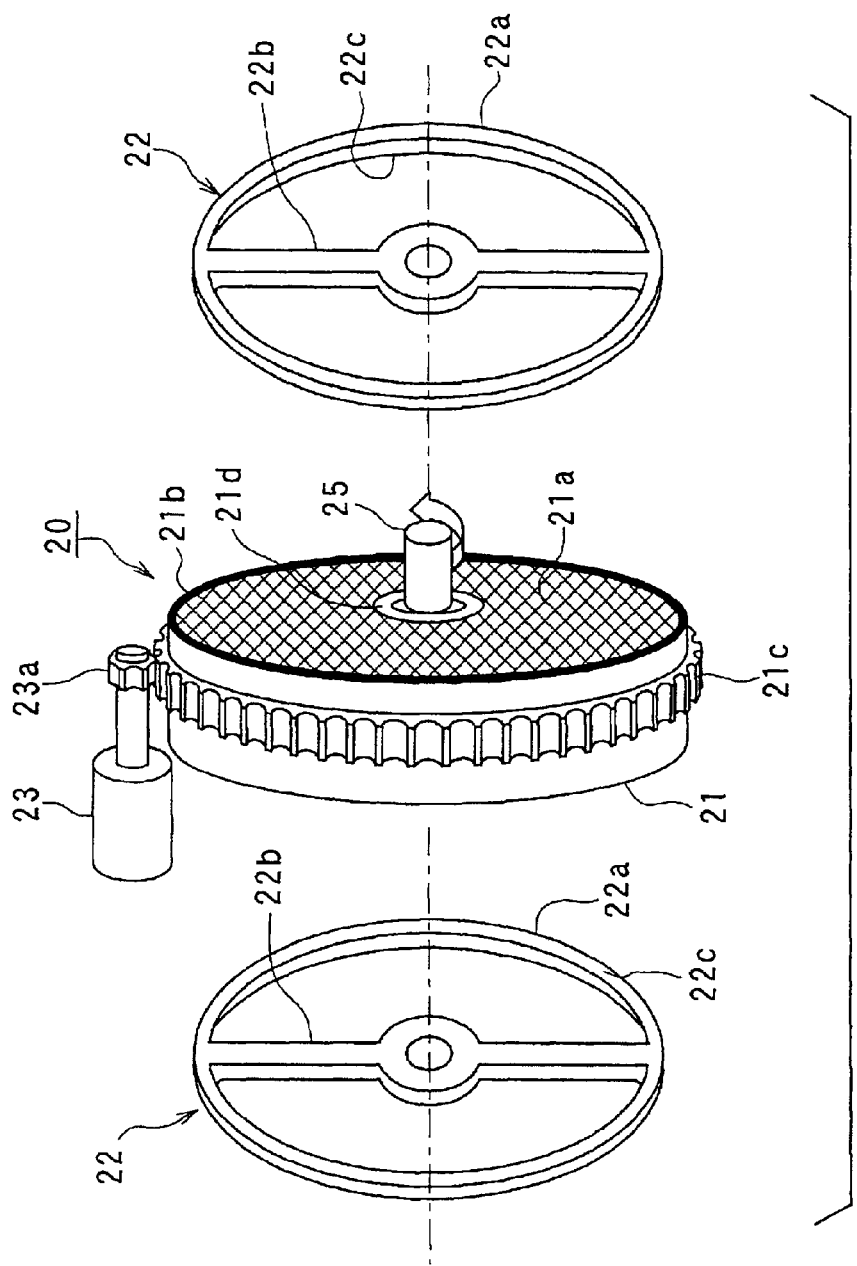
FIG. 3 is an exploded perspective view of an evaporation section of the hydrogen supply device of FIG. 2.

FIG. 3 is an exploded perspective view of the evaporation section 20 (heat exchange section). As shown in FIG. 3, the evaporation section 20 includes a rotary thermal storage (matrix) 21 for storing thermal energy, a pair of rest gas seals 22 for preventing gas leakage in slidable contact with the matrix 21, and a driving motor 23 for rotary driving the matrix 21.

The matrix 21 is formed in a disk shape and of a heat resistance ceramic such as cordierite. The matrix 21 has a honeycomb structure having many through holes (cells) 21a along an axial direction formed therein. A peripheral surface section 21b of the matrix 21, which is in contact with gas seals 22, is either coated with cement or firmly fixed by a solid ceramic ring so as to form a sealing surface.

Figure 4A:
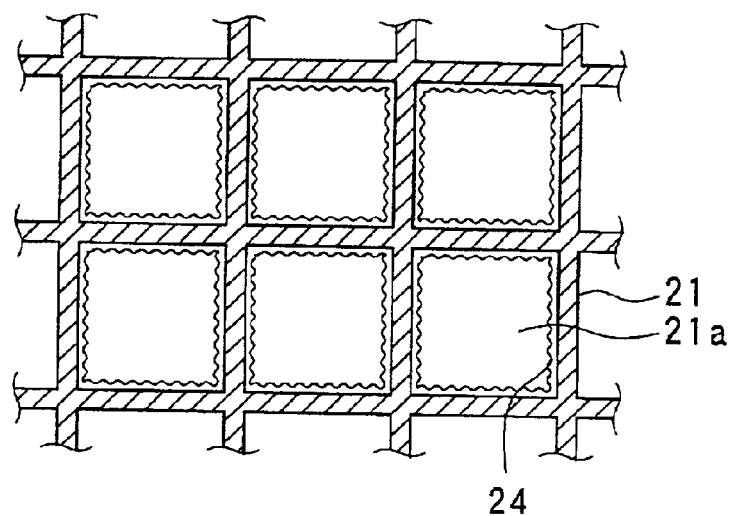
FIG. 4A is a partly enlarged cross sectional view of a matrix of the rotary thermal storage of FIG. 3.
Figure 4B:
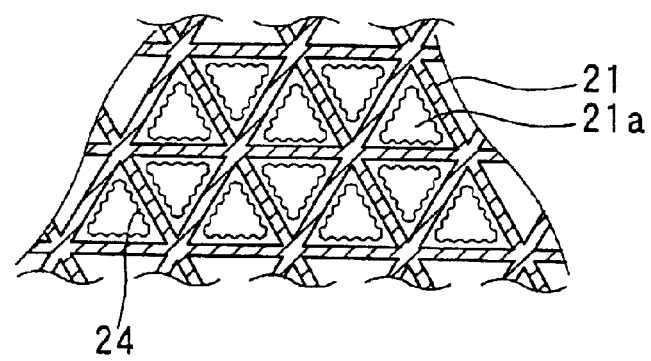
FIG. 4B is a partly enlarged cross sectional view of another matrix of the rotary thermal storage of FIG. 3.

FIGS. 4A and 4B are diagrams illustrating examples of cell configurations composing the rotary thermal storage 21, in which FIG. 4A shows a triangular cell, and FIG. 4B shows a triangular cell. An oxidation catalyst (such as platinum, palladium, or a mixture thereof) 24 is attached to (or supported on) each surface of the cell. Thereby, the off gas of the fuel cell 60 supplied to the high temperature fluid passage B can be catalytically burned.

A rotating shaft 25 and a bearing 26 provided on the housing 1 supports the matrix 21. The rotating shaft 25 is fixed on a solid hub 21d provided at the center of the matrix 21. The matrix 21 is driven to rotate by a power motor 23. On a peripheral surface of the matrix 21, a ring gear 21c is provided. The rotary force from the power motor 23 is transferred to the ring gear 21c through a pinion 23a that is fixed on the rotating shaft of the power motor 23. Because the bearing 26 as a sliding member is used in a high temperature atmosphere, it is formed of a high-temperature nonluburicant material (such as hard carbon material).

The gas seals 22 are formed of a ceramic or a heat resistance metal such as stainless steal, for example. Each of the gas seals 22 is formed in such a manner that a cylindrical flange 22a and a cross arm 22b passing radially through the center thereof are integrated into one body. Each sealing surface 22c of the gas seals 22, which are in contact with the peripheral surface 21b of the matrix 21, is formed by coating or the like of a high-temperature nonlubricant material layer (not shown) having a low coefficient of friction in order to reduce friction of the matrix 21 and the gas seals 22.

In order to prevent the high pressured reforming material flowing in the low temperature fluid passage A from leaking into the high temperature fluid passage B, the gas seals 22 lie between the matrix 21 and the housing 1 for sealing. The gas seals 22 are fixed onto the housing 1 while the sealing surfaces 22c are interposing the matrix 21 from both sides along the axial direction. The matrix 21 is divided into two areas by the cross arms 22b of the gas seals 22, respectively.

As shown in FIG. 2, the matrix 21 is placed so as to cross over both of the low temperature fluid passage A and the high temperature fluid passage B, which are disposed parallel to each other. At that time, one area that is divided by the cross arms 22b of the gas seals 22, respectively, is positioned in the low temperature fluid passage A, while another area is positioned in the high temperature fluid passage B. The matrix 21 makes sliding-rotation movement between the gas seals 22, and alternatively moves between the low temperature fluid passage A through which the first reforming material passes and the high temperature fluid passage B through which the off gas (combustion gas) passes.

In the high temperature fluid passage B, the matrix 21 receives the heat from the combustion gas passing through the through holes 21a, and then moves to the low temperature fluid passage A to transfer the heat to the first reforming material passing through the through holes 21a so as to heat and evaporate the material. At that time, by controlling rotating speed of the matrix 21, a heat transfer rate from the high temperature fluid passage B to the low temperature fluid passage A can be adjusted. Specifically, by increasing the rotation speed of the matrix 21, the heat transfer rate can be increased. Likewise, by decreasing the rotation speed, the heat transfer rate can be decreased.

On a downstream side of the evaporation section 20, the second reforming material supply section 30 is provided.

The second reforming material supply section 30 is provided with a fuel flow rate control valve 31, a spray nozzle 32 and a mixing chamber 33. In the second reforming material supply section 30, the reforming fuel (the second reforming material), whose flow rate is controlled by fuel flow rate control valve 31, is sprayed into the mixing chamber 33 so that the second reforming material is mixed with and vaporized together with the vaporized and evaporated first reforming material passed through the evaporation section 20.

On a downstream side of the second reforming material supply section 30, the reforming section 30 is provided. In the reforming section 40, the evaporated reforming material after heated in the evaporation and reforming sections 20 and 40 is reformed to generate a reformed gas containing $H_2$ and CO. In the reforming section 40 according to the first embodiment, both of the partial oxidation reforming (exothermic reaction) and the vapor steam reforming (endothermic reaction) are carried out.

Figure 5:
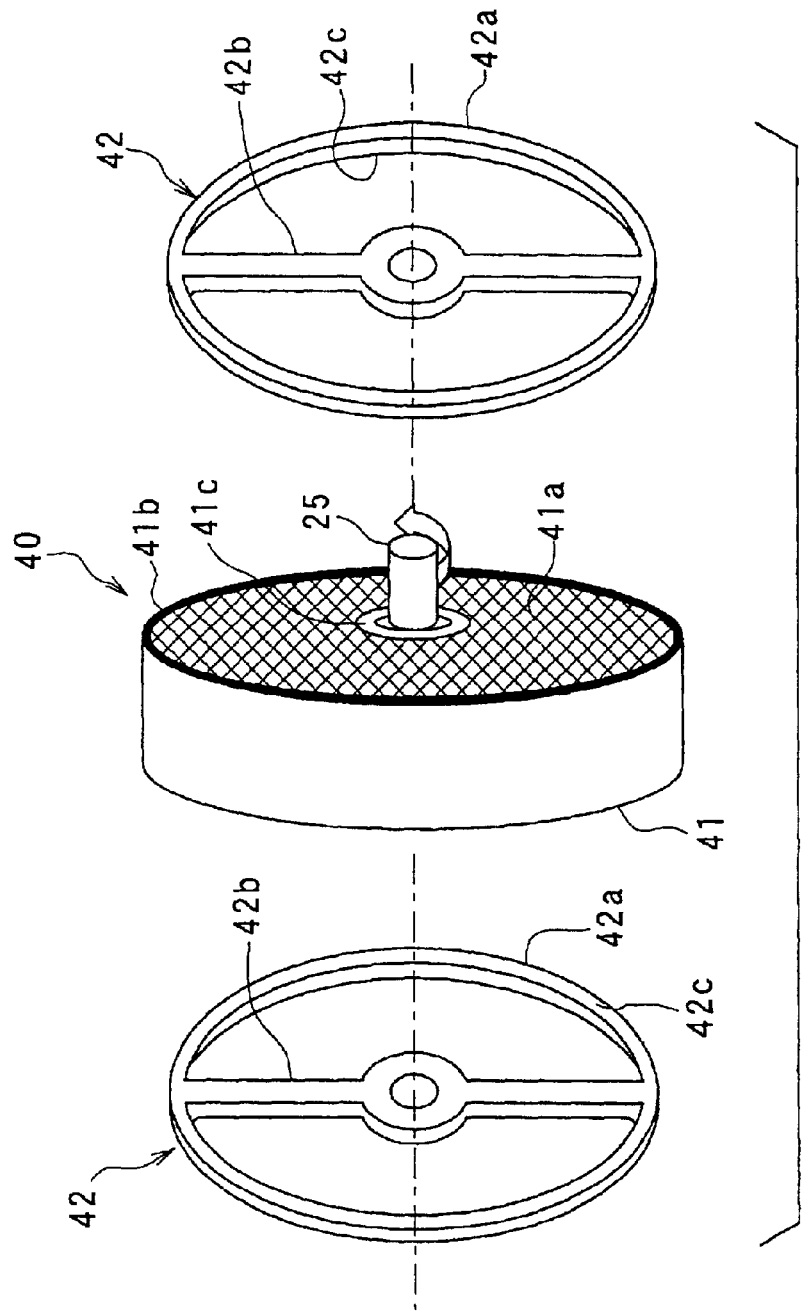
FIG. 5 is an exploded perspective view of a reforming section of the hydrogen supply device of FIG. 2.

FIG. 5 is an exploded perspective view of the reforming section 40. As shown in FIG. 5, the reforming section 40 is a rotary heat exchanger similar to the evaporation section 20 shown in FIG. 3 but not having the rotary drive mechanism such as the driving motor 23 and the ring gear 21c. A reforming catalyst (an element of nickel oxide, copper oxide, platinum, palladium or the like, or a mixture thereof) is affixed on each surface of through holes 41a of the rotary thermal storage 41 constituting the reforming section 40.

As mentioned above, the reforming section 40 does not have its own drive mechanism but has a shaft concentrically integrated with the rotating shaft 25 of the evaporation section 20. With this construction, the rotary thermal storage 41 of the reforming section 40 is rotatingly driven by the driving motor 23 provided in the evaporation section 20 so as to rotate together with the rotary thermal storage 21 of the evaporation section 20. By controlling rotating speed of the matrix 41 of the reforming section 40, a heat transfer rate from the high temperature fluid passage B to the low temperature fluid passage A can be adjusted, which is similar as the evaporation section 20.

The matrix 41 of the reforming section 40 is placed, similarly to the matrix 21 of the evaporation section as shown in FIG. 2, so as to cross over both of the low temperature fluid passage A and the high temperature fluid passage B, which are disposed parallel to each other. As respective gases passing through the low and high temperature fluid passages A and B flow in opposite directions, gas flows from the evaporation section 20 on a upstream side to the reforming section 40 in the low temperature fluid passage and from the reforming section 40 on an upstream side to the evaporation section 20 in the high temperature fluid passage.

On a downstream side of the reforming section 40, there is provided a temperature sensor 50 (temperature detection means) for detecting temperature of the gas having passed through the reforming section 40, that is, indirectly detecting a temperature of reforming catalyst of the reforming section 40.

On the downstream side of the temperature sensor 50, there are provided a cooling section 51 for cooling the reformed gas to a required temperature for eliminating CO and a CO eliminating section 52 for eliminating CO from the reformed gas cooled via the cooling section 51 to produce a hydrogen rich gas.

On the upstream side of the evaporation section 20 in the high temperature fluid passage B, a combustion gas supply section 70 (an off gas supply section) is provided for heating the evaporation section 20. The combustion gas supply section 70 includes the off air flow rate control valve 71, a fuel flow rate control valve 72 (a combustion fuel supply section), an off air flow rate control valve 73, a spray nozzle 74, an ignition plug 75 (igniting means), and a mixing/combustion chamber 76. To the combustion gas supply section 70, the off gas containing unreacted hydrogen discharged from the fuel cell 60 is supplied through an off gas supply path 61. Moreover, to the combustion gas supply section 70, an off air containing unreacted oxygen discharged from the fuel cell 60 is supplied through an off air supply path 62.

The off gas and the off air are sprayed from the spray nozzle 74 to the mixing/combustion chamber 76 so as to make an off gas mixture. The off gas mixture is supplied to the reforming section 40 and, then, to the evaporation section 20, and burned catalytically in the reforming and evaporation sections 40 and 20. The combustion heat of the combustion gas heats up the rotary thermal storages 41 and 21.

When the hydrogen supply device is actuated at a starting time, instead of the off gas, an actuation fuel (the combustion fuel), whose flow rate is controlled by a fuel flow rate control valve, is sprayed to the combustion chamber 76, and is ignited by the ignition plug 75, thereby generating the combustion gas by flame combustion. In the first embodiment, a liquid petroleum type fuel similar to the reforming fuel, is used as the actuation fuel.

Figure 6:
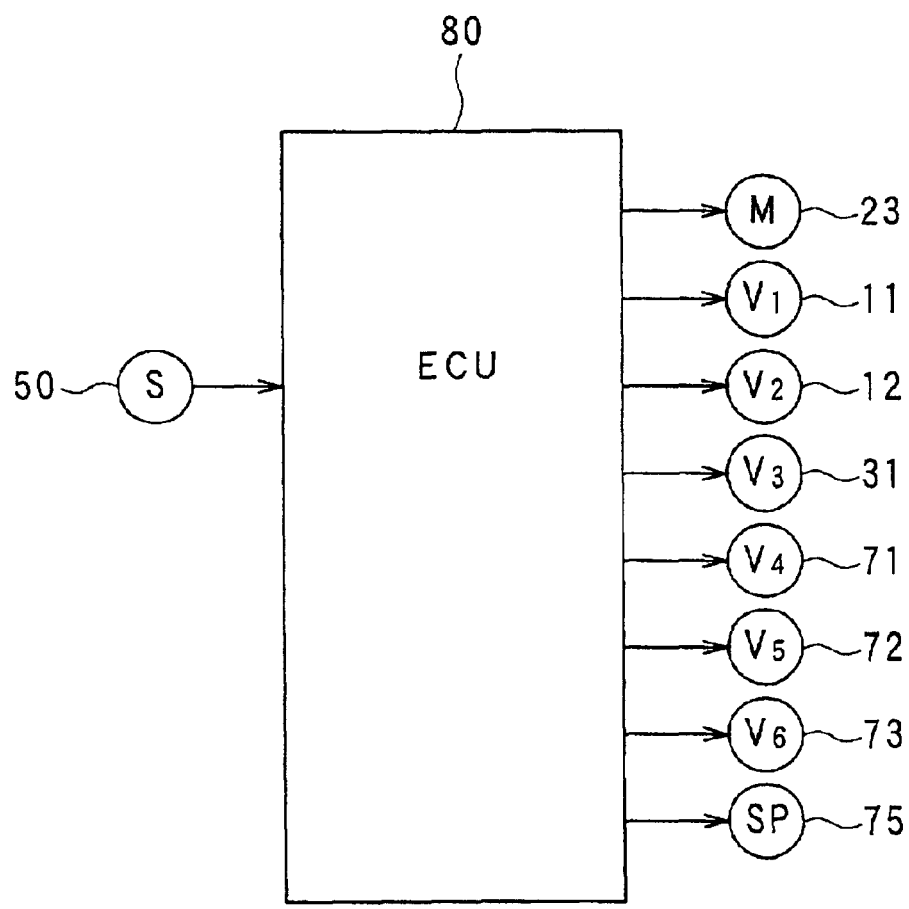
FIG. 6 is a conceptual diagram of a control system of the hydrogen supply device of FIG. 2.

FIG. 6 illustrates a controlling system of the hydrogen supply device. As shown in FIG. 6, the hydrogen supply device of the first embodiment includes a control section (ECU) 80 for performing various controls. A temperature signal detected by the temperature sensor 50 is input to the control section 80 so as to output control signals to the driving motor 24, the flow rate control valves 11, 12, 31, 71, 72 and 73, and the ignition plug 75.

An activation of the hydrogen supply device having the above-described structure will be described below. First, actuation of the hydrogen supply device at the starting time will be described. In order to start the reforming reaction in the reforming section 40, it is necessary that the reforming material supplied to the reforming section 40 is evaporated and vaporized, and that a temperature of the reforming catalyst of the reforming section 40 is elevated to a predetermined temperature so as to be able to start the reforming reaction.

Then, in the combustion chamber 76 of the combustion gas supply section 70, the actuation fuel and the air are mixed to generate a fuel-air mixture, and then ignited by the ignition plug 75 for flame combustion. The combustion gas generated by the flame combustion flows through the reforming section 40 and the evaporation section 20 by running through the high temperature fluid passage B. Thereby, portions of the rotary thermal storages 41 and 21 located in the high temperature fluid passage B are heated by the combustion gas. At this time, air is supplied to the first reforming material supply section 10.

At the reforming section 40, the reforming catalyst provided in the rotary thermal storage 41 is directly heated. At the evaporation section 20, due to rotation of the rotary thermal storage 21, the portion which is heated by the combustion gas moves to the low temperature fluid passage A, thus causing the air flowing in the low temperature fluid passage A to be heated. Because the heated air flows in the low temperature fluid passage A, each component on the downstream side of the evaporation section 20 is rapidly warmed up.

Temperature, for example, 300 to 400° C., at the evaporation section 20 is required for vaporizing the reforming material. Temperature, for example, 400 to 700° C., at the reforming section 40, that is higher than that at the evaporation section 20, is required for the reforming reaction. Since the high temperature gas (high temperature fluid) passes through the evaporation section 20 after passing through the reforming section 40 in the high temperature fluid passage B, the reforming section 40 is heated with a higher priority so that the respective catalysts are rapidly heated up effectively according to the order of the temperature required for the catalytic reactions.

At that time, the combustion gas generated in the combustion gas supply section 70 contains a harmful gas due to incomplete combustion or the like. However, when the combustion gas passes through the rotary thermal storages 41 and 21, the gas is catalytically burned (i.e., a catalytic oxidization reaction occurs). Thus, the combustion gas can be used completely for an oxidization reaction (complete combustion) when a mixture ratio of the actuation fuel and the air is appropriately adjusted for the flame combustion, and the harmful component in the combustion gas is catalytically burned in the reforming and evaporation sections 40 and 20. Accordingly, the harmful gas contained in the combustion gas is sufficiently purified to be exhausted to the outside.

The combustion heat of the combustion gas rapidly warms up (i.e., pre-heats) each component of the reforming system such as the heat exchange section 20, the reforming section 40, and the CO eliminating section 52 (a shift section and a purifying section). Then, when a temperature of the reforming section 40 detected by the temperature sensor 50 reaches a predetermined temperature for starting the reforming reaction, it is identified that each temperature of components of the reforming system including the reforming catalyst has reached to the point where the reforming reaction can be initiated. Accordingly, the actuation fuel supplied in the combustion gas supply section 70 is ceased to stop the flame combustion.

The predetermined temperature for starting the reforming reaction may be arbitrarily set according to a type of the reforming fuel and the like. When a petroleum type fuel is used as the reforming fuel as in first embodiment, the temperature may be set to about 300° C. to 400° C.

When warming up of each component is completed, the first reforming material supply section 10 starts supplying the reforming material (the mixture of water and air). The first reforming material is heated and evaporated in the evaporation section 20 and, then, mixed with the second reforming material (reforming fuel) in the second reforming material supply section 30 to form an evaporated reforming material composing of the water, the air and the reforming fuel.

The evaporated reforming material is reformed in the reforming section 40 to the reformed gas containing $H_2$ and CO. After the reformed gas is cooled in the cooling section 51, CO of the reformed gas is eliminated in the CO eliminating section 52, and the reformed gas is supplied to the fuel cell 60.

In the fuel cell 60, a chemical reaction occurs between hydrogen and oxygen to generate power, and the off gas containing unreacted hydrogen and the off air containing unreacted oxygen are emitted. The off gas and the off air are introduced into the combustion gas supply section 70 of the high temperature fluid passage B through the off gas supply path 61 and the off air supply path 62, respectively, so as to become an off gas mixture. The off gas mixture is supplied to the reforming section 40 and to the evaporation section 20, and the catalytic combustion is initiated as it passes through the rotary thermal storages 41 and 21. The heat generated by the catalytic combustion of the off gas directly heats up the reforming catalyst in the reforming section 40 and is stored in the rotary thermal storage 21 in the evaporation section 20. When the rotary thermal storage 21 makes a rotating movement, the first reforming material passing through the low temperature fluid passage A is heated and evaporated.

As such, the heat generated by the catalytic combustion of the off gas heats up the reforming catalyst of the reforming section 40 and evaporates the reforming material. Accordingly, each heating of the evaporation section 20 and the reforming section 40 is switched from heating by the flame combustion of the actuation fuel to heating by the off gas combustion, thus enabling to start self-driving of the hydrogen supply device.

Next, when a load in the fuel cell 60 fluctuates, a supply amount of the reforming material is adjusted according to the load fluctuation of the fuel cell 60 so as to adjust an amount of hydrogen supplied to the fuel cell 60. When the supply amount of hydrogen increases in the hydrogen supply device, a temperature of the reforming section 40 lowers due to an increase of heat absorption caused by the reforming reaction in the reforming section 40, and thus it become necessary to increase a heating amount of the reforming section 40.

However, there is a time lag between the increase in the supply amount of hydrogen in the hydrogen supply device and an increase in an exhaust amount of the off gas in the fuel cell 60. Thus, when the supply amount of hydrogen in the hydrogen supply device is rapidly increased, the combustion heat from the off gas combustion may become insufficient. In this case, by temporarily spraying the actuation fuel in the combustion gas supply section 70 to ignite by the ignition plug 75, the combustion heat of the flame combustion may be used for feeding the heat. Accordingly, the reforming reaction can always be facilitated under a desired temperature.

Moreover, by increasing the mixture ratio of the air in the reforming material, it is possible to increase a rate of a partial oxidization reaction (exothermal reaction) in the reforming section 40, thus increasing the heat generation amount in the reforming section 40. This also can be used to compensate any shortage of the combustion heat of the off gas combustion.

Furthermore, by accelerating the rotation speed of the rotary thermal storages 41 and 21, a heat transfer rate from the high temperature fluid passage B to the low temperature fluid passage A can be increased, thereby compensating the combustion heat shortage of the off gas combustion.

It should be appreciated that the temperature sensor 50 can directly detect lowering of a temperature of the reforming section 40 due to the load increase in the fuel cell 60. Alternatively, when the fuel cell 60 is used as a driving power of a motor for vehicle running, for example, it may have a structure in which the load fluctuation of the fuel cell 60 is predicted based on a degree of throttle opening so as to predict a change in the temperature of the reforming section 40.

In order to stop the supply of hydrogen from the hydrogen supply device to the fuel cell 60, supply of the reforming fuel and water is stopped first, and then the air supply is stopped. During that time, a combustible mixture gas remaining in the low temperature fluid passage A is burned completely within the evaporation section 20 in the high temperature fluid passage B or by the catalytic combustion on a surface thereof, thus suppressing an exhaust of emission.

In the rotary heat exchanger having the evaporation section 20 and the reforming section 40 according to the first embodiment, gas leaks occur from the low temperature fluid passage A, which is under high pressure, to the high temperature fluid passage B, which is under low pressure, at the evaporation section 20 and the reforming section 40. There are two types of gas leaks occurring in the rotary heat exchanger. One is a seal leakage in which the gas directly leaks between the rotary thermal storages 21 and 41 and the gas seals 22 and 42. The other is a transfer leakage in which the gas is trapped and transferred in the rotary thermal storages 21 and 41. A largeness of the seal leakage is in proportion to a value of pressure difference between the low temperature fluid passage A and the high temperature fluid passage B and a space largeness in the contact surfaces between the rotary thermal storages 21 and 41 and the gas seals 22 and 42. A leakage amount of the transfer leakage (carry over loss) depends on a transfer volume of space defined by the cross arms 22b and 42b of the gas seals 22 and 42 and by the through holes 21a and the 41a of the rotary thermal storages 21 and 41 (due to a rotary movement of the rotary thermal storages). A total gas leakage at the evaporation section 20 and the reforming section 40 is a sum of the seal leakage and the transfer leakage.

The seal leakage may be prevented to a certain extend by improving its construction. However, it is very difficult to reduce the transfer leakage, which occurs due to the gas trap in the rotary thermal storages 21 and 41, from a standpoint of an inherent structure of the rotary heat exchanger.

As a result, at the evaporation section 20, the reforming fuel flowing in the low temperature passage A may be mixed with the combustion gas flowing in the high temperature fluid passage B so that unreacted reforming fuel is exhausted as a harmful gas to the outside.

To deal with the problem, the first embodiment has a structure in which supply sources of multiple reforming materials are divided, and the reforming fuel is supplied on the downstream side of the evaporation section 20, so that the reforming fuel does not go through the rotary heat storage type evaporation section 20. With such structure, only the first reforming material (the water and the air) without the reforming fuel passes through the evaporation section 20 on the low temperature fluid passage A side, and therefore, leaked gas to the high temperature fluid passage B does not contain any harmful component. The first reforming material is heated to a high temperature by passing through the evaporation section 20. The heated first reforming material performs heating, evaporation, and mixing with the second reforming material (a liquid reforming fuel) on the downstream side of the evaporation section 20, so as to generate the reforming material composed of the water, the air and the reforming fuel.

Further, a part of the reforming material formed in the second reforming material supply section 30 is trapped by the rotary thermal storage 41 of the reforming section 40 and transferred to the high temperature fluid passage B. The leaked gas including the reforming material flows to the evaporation section 20 and, after the harmful gas (unburned fuel) is sufficiently purified due to the oxidation reaction (catalytic combustion) at the rotary thermal storage 21, the leaked gas is exhausted to the outside. The heat generated due to the oxidation reaction at the rotary thermal storage 21 is used as a heating source for heating up the first reforming material.

With the structure of the hydrogen supply device according to the first embodiment, in which the reforming section 40 is the rotary heat exchanger, the reforming catalyst is directly heated by the high temperature fluid (gas) so that temperature of the reforming catalyst is effectively and rapidly increased to a given temperature at which the reforming reaction starts. Accordingly, the reforming reaction starts within a shorter period at the starting time of the device and, when the load of the fuel cell 60 fluctuates, higher response of the device is assured.

Further, as the evaporation section 20 is also the rotary heat exchanger, the heat of the high temperature gas (high temperature fluid) flowing in the high temperature fluid passage B is effectively transferred to the low temperature gas (low temperature fluid) flowing in the low temperature fluid passage A. Accordingly, the reforming reaction starts within a shorter period at the starting time of the device and, when the load of the fuel cell 60 fluctuates, the higher response thereof is assured.

As mentioned above, the rotary heat exchanger has an advantage that a heat transfer amount per a unit area is larger since it is not a type that the heat exchange between the high and low temperature fluid is not conducted through an isolation wall interposed therebetween and a heat transfer surface itself heated by the high temperature fluid heat up the low temperature fluid. Accordingly, a heat exchange efficiency is higher and the heat transfer surface for securing the required heat transfer amount is limited to a smaller area. Therefore, the reforming reaction starts within a shorter period at the starting time of the device and, when the load of the fuel cell 60 fluctuates, the higher response thereof is assured and the device itself is more compact.

Furthermore, temperatures of the rotary thermal storages 21 and 41 are adjusted to adequate values by controlling the rotating speeds of the rotary thermal storages 21 and 41 according to the demanded temperatures for heating so that the heat temperatures of the reforming material and the reforming catalyst are adequately adjusted.

Moreover, as the rotary thermal storage 21 of the evaporation section 20 and the rotary thermal storage 41 of the reforming section 40 have an integrated rotating shaft as shown in the first embodiment, both of the rotary thermal storages 21 and the 41 are driven by a piece of the driving unit 23. Accordingly, the device is more compact with higher performance efficiency.

Further, as shown in the hydrogen supply device according to the first embodiment, the supply sources of the reforming material are so divided that the water and the air are supplied to the upstream side of the evaporation section 20 and the reforming fuel is supplied to the downstream side of the evaporation section 20. As a result, the device, even if the gas leaks in the rotary heat exchanger, prevents the unreacted reforming fuel from being exhausted as the harmful gas to the outside.

Further, the off gas supply section and the combustion section for starting are integrated into one body so that device is more compact.

Furthermore, at a starting time of the hydrogen supply device, each component of the reforming system (the evaporation section 20 or the reforming section 40) is heated up by heating the rotary thermal storages 21 and 41 due to the flame combustion of the fuel to be used for starting so that the component is rapidly increased to the temperature at which the reforming reaction starts. Accordingly, the reforming reaction starting time is shorter.

Moreover, the heat generated due to the off gas combustion in the evaporation section 20 is used to heat and vaporize the reforming material, that is, as a supplement to the heat necessary for the exothermic reaction (vapor steam reforming reaction) in the reforming section 40 so that the performance efficiency of the device is higher.

(Second Embodiment)

Next, referring to FIG. 7, a hydrogen supply device according to a second embodiment of the present invention will be described. When comparing the second embodiment with the above-described first embodiment, configurations are different in a second reforming material supply section 30. The same members as in the above-described first embodiment are denoted with the same reference numerals, and description thereof is omitted.

In a case that the second reforming material (reforming fuel) is supplied to the downstream side of the evaporation section 20 as shown in the first embodiment, it is necessary to effectively mix the first reforming material with the second reforming material in a short time. Accordingly, the second reforming material supply section 30 according to the second embodiment has a mixing section 33 (mixing chamber) in which the first and second reforming material are effectively mixed with each other.

Figure 7A:
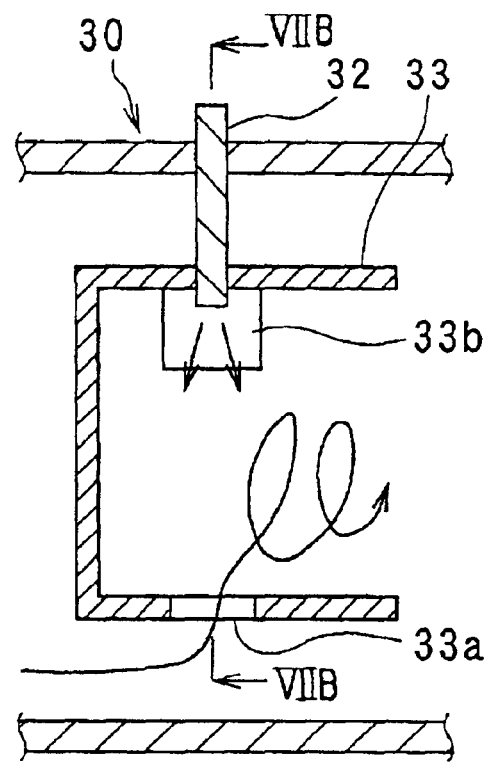
FIG. 7A is an enlarged cross sectional view of a second reforming material supply section according to second embodiment.
Figure 7B:
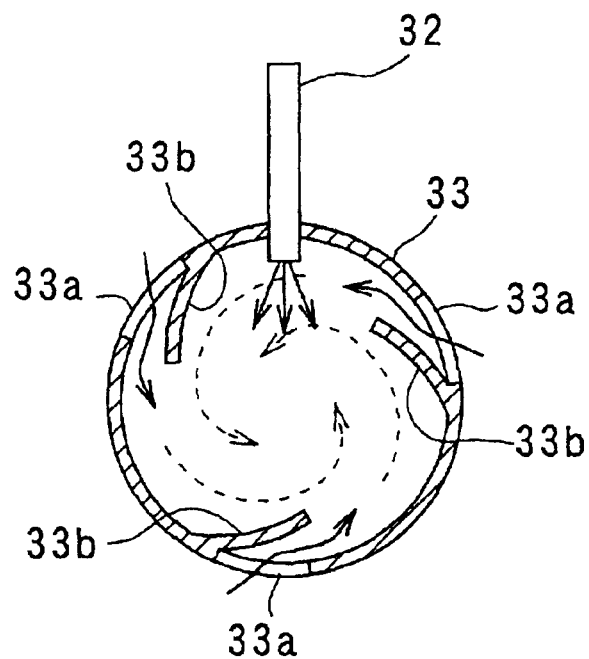
FIG. 7B is a view taken along a line VIIB—VIIB in FIG. 7A.

FIG. 7A is an enlarged cross-sectional view of the mixing chamber 18 in the second reforming material supply section 30, and FIG. 7B shows a cross-sectional view taken along VIIB-VIIB in FIG. 7A. As shown in FIGS. 7A and 7B, the mixing chamber 33 is a cylindrical shape having an opening on the downstream side. The mixing chamber 33 has an inlet port 33a for introducing the first reforming material (the water-air mixture) into the mixing chamber by cutting out a plurality of places inside the peripheral surface (three places in the present invention), and guiding plates 33b for generating vortex flow of the first reforming material.

In the second reforming material supply section 30, the first reforming material flows into the mixing chamber 33 in a nearly tangential direction from a side surface of the mixing chamber 33 and the reforming fuel as the second reforming material is sprayed into the mixing chamber 33 by a spray nozzle 32. Thereby, the second reforming material is mixed with the first reformed. At that time, the first reforming material forms the vortex flow in the mixing chamber 18 so that diffusion of the second reforming material is promoted. Therefore, it is possible to efficiently mix the first reforming material and the second reforming material in a short period of time.

(Third Embodiment)

Figure 8:
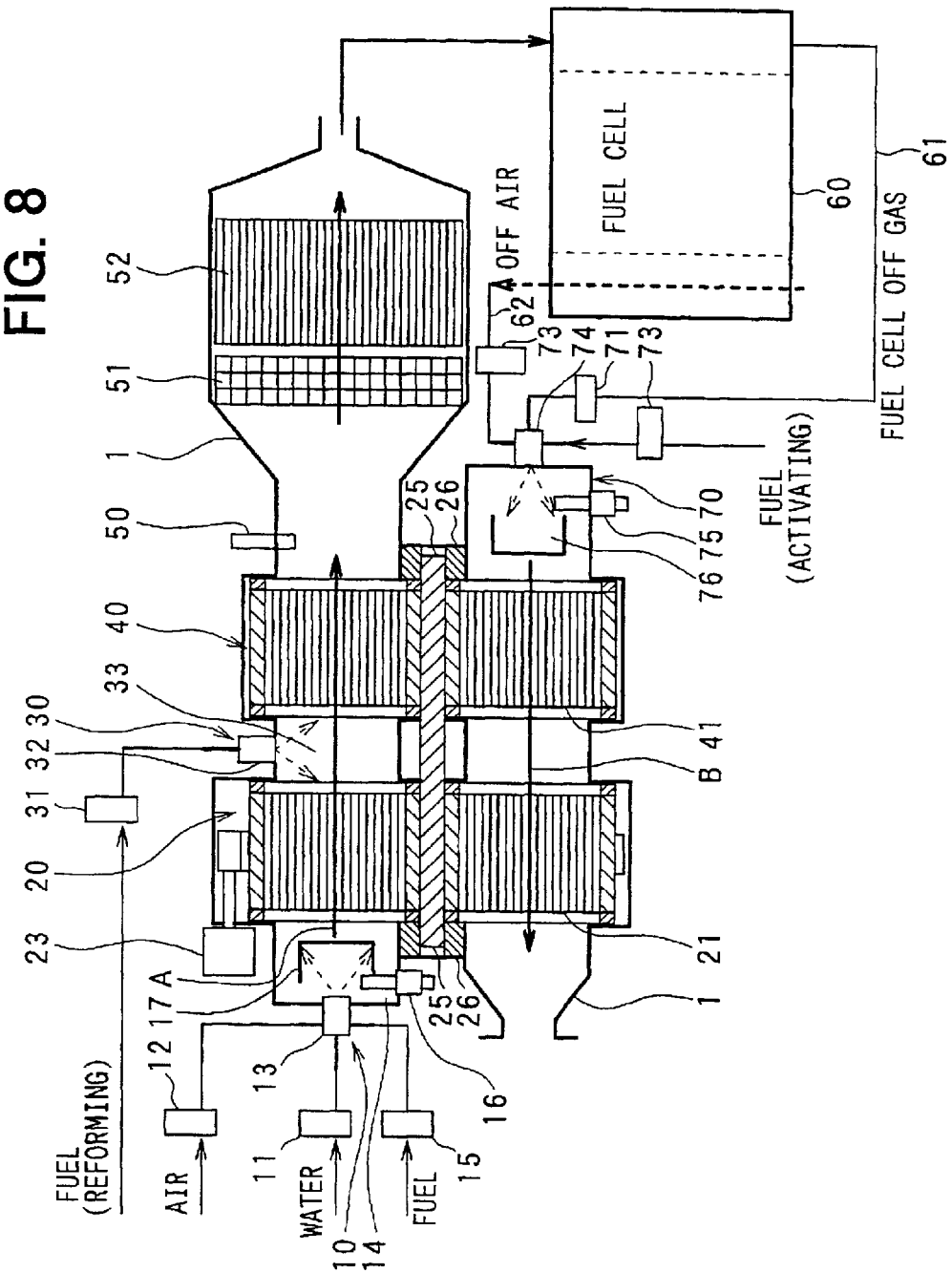
FIG. 8 is a conceptual diagram illustrating an arrangement of components of the hydrogen supply device according to third embodiment.

Referring now to FIG. 8, a third embodiment of the present invention will be described. As shown in FIG. 8, when the third embodiment is compared to the above-described first embodiment described above, it is different in that a fuel flow rate control valve 15, an ignition plug 16 and a combustion chamber 17 are provided in the first reforming material supply section 10. Members similar to the above-described first embodiment will be denoted with the same reference numerals, and description thereof is omitted.

As described above, in a hydrogen supply device according to the third embodiment, the first reforming material supply section 10 is provided with the fuel flow rate control valve 15 for controlling a flow rate of actuation fuel, the ignition plug 16 for igniting the actuation fuel for flame combustion, and the combustion chamber 17 for maintaining the flame combustion.

With the above-described structure, at a starting time of the hydrogen supply device, the flame combustion can be generated in the first reforming material supply section 10 in addition to the flame combustion in the combustion gas supply section 70. Thus, the heat is generated in the high temperature fluid passage B by the flame combustion in the combustion gas supply section 70 and the heat is generated in the low temperature fluid passage A by the flame combustion of the fuel in the first reforming material supply section 10, while each of the rotary thermal storages 21 and 41 is heated in a rest state. Accordingly, the evaporation section 20 and the reforming section 40 can be heated rapidly, thus enabling to perform a start-up of the reforming reaction even more rapidly.

Moreover, when a load of the fuel cell 60 is fluctuated, by temporary generating the flame combustion in the first reforming material supply section 10, a deficiency of the combustion heat of the off gas is rapidly supplemented.

(Fourth Embodiment)

Figure 9:
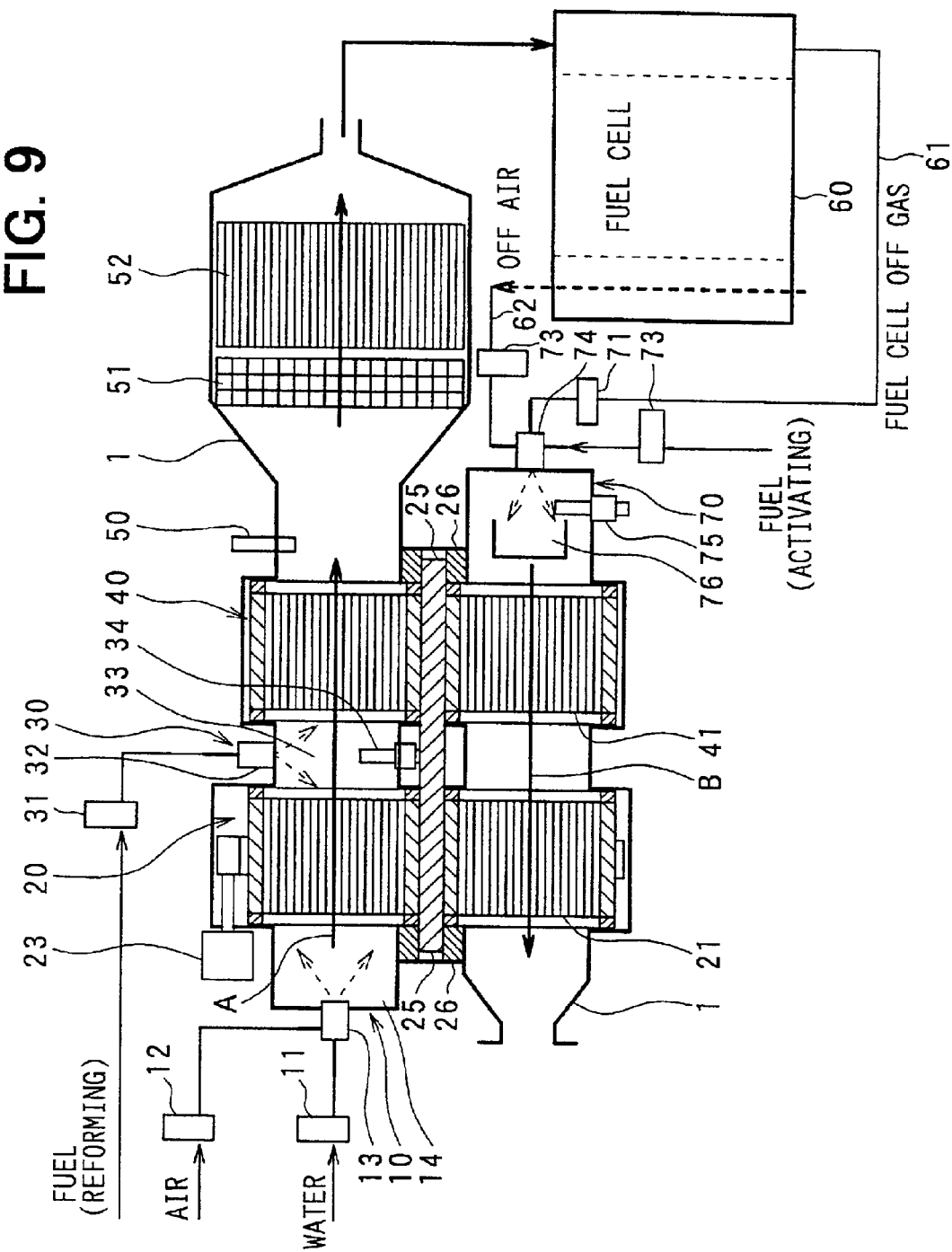
FIG. 9 is a conceptual diagram illustrating an arrangement of components of the hydrogen supply device according to fourth embodiment.

Referring to FIG. 9, a fourth embodiment of the present invention will be described. As shown in FIG. 9, when the fourth embodiment is compared to the above-described first embodiment described above, it is different in that an ignition plug 34 is provided in the second reforming material supply section 30. Members similar to the above-described first embodiment will be denoted with the same reference numerals, and description thereof is omitted.

With the above-described structure, at a starting time of the hydrogen supply device, the flame combustion can be generated in the second reforming material supply section 30 in addition to the flame combustion in the combustion gas supply section 70. Accordingly, the reforming section 40 can be heated rapidly, thus enabling to perform a start-up of the reforming reaction even more rapidly.

Moreover, when a load of the fuel cell 60 is fluctuated, by temporary generating the flame combustion in the second reforming material supply section 30, a deficiency of the combustion heat of the off gas is rapidly supplemented.

(Fifth Embodiment)

Figure 10:
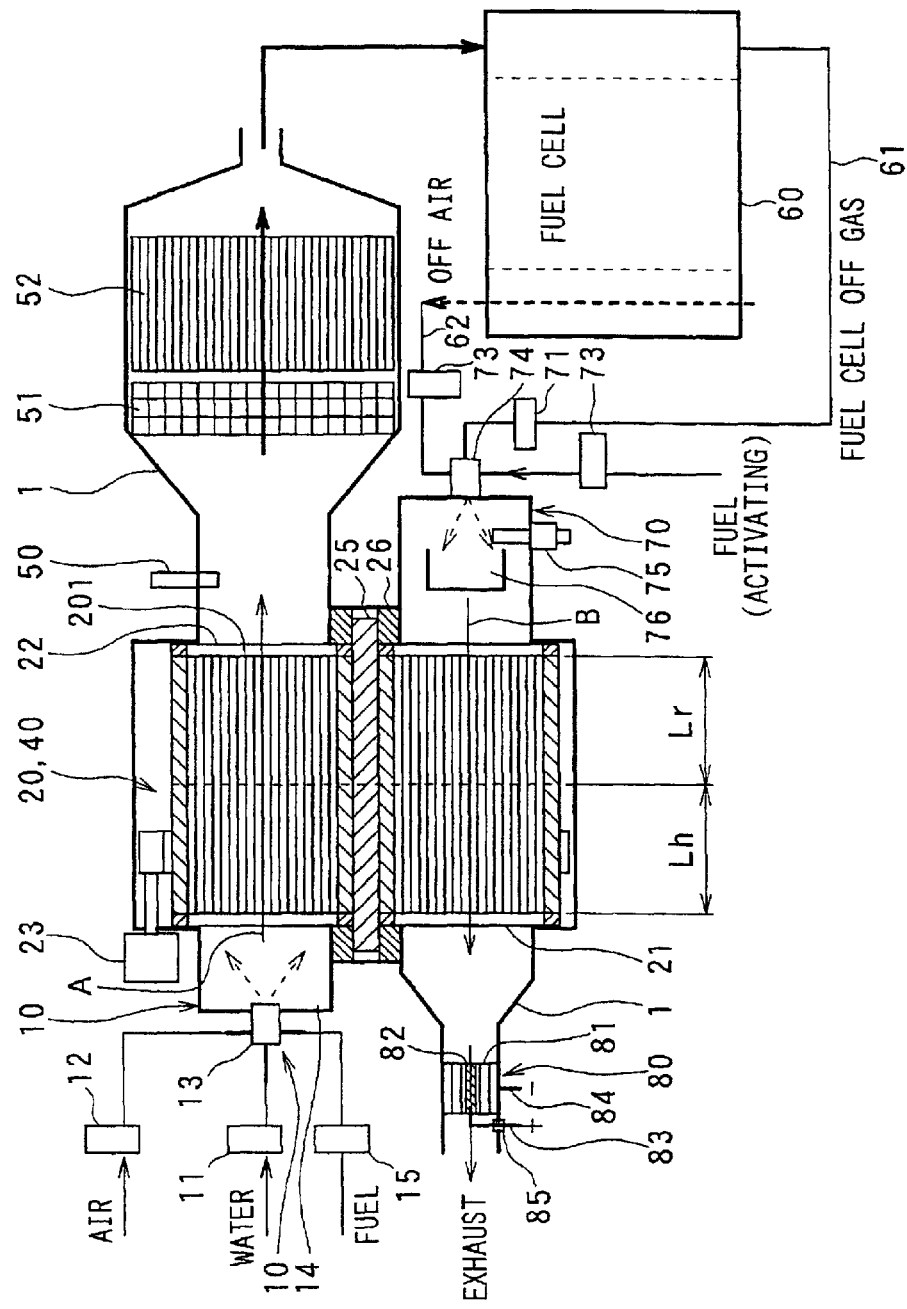
FIG. 10 is a conceptual diagram illustrating an arrangement of components of the hydrogen supply device according to fifth embodiment.
Figure 11:
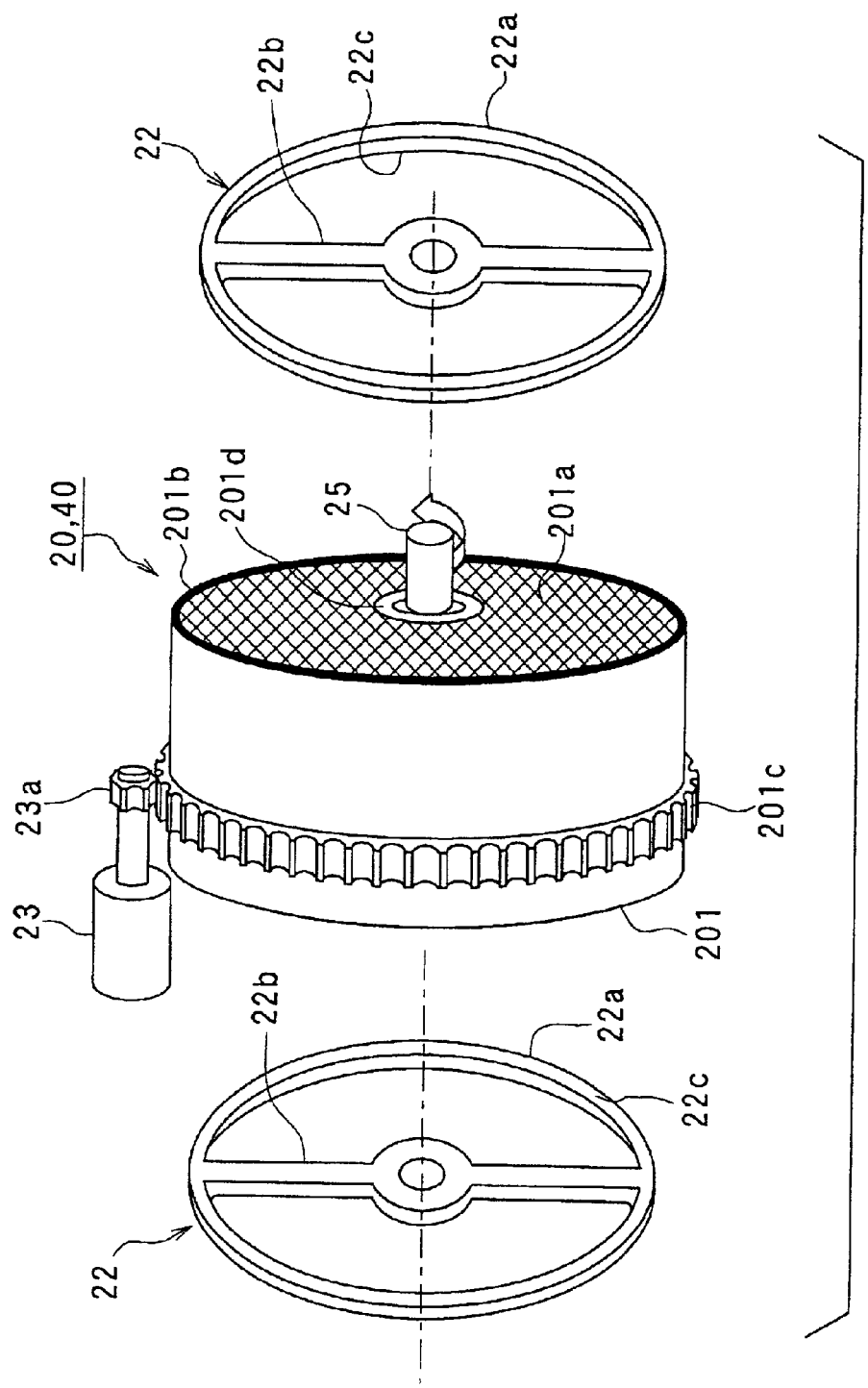
FIG. 11 is an exploded perspective view of evaporation and reforming sections of the hydrogen supply device of FIG. 10.

Referring to FIGS. 10 and 11, a fifth embodiment of the present invention will be described. When the fifth embodiment is compared to the above-described first embodiment, it is different in that the evaporation section and the reforming section are integrally formed and, further, an exhaust purification section is provided in the high temperature fluid passage on a downstream side of the rotary thermal storage. Members similar to the above-described first embodiment will be denoted with the same reference numerals, and description thereof is omitted.

FIG. 10 is a conceptual diagram illustrating an arrangement of components of the hydrogen supply device according to the fifth embodiment. As shown in FIG. 10, the evaporation section 10 for heating and evaporating the reforming material and a reforming section 40 for producing hydrogen rich gas due to reforming reaction have a common rotary thermal storage 201.

The first reforming material supply section 10 is provided with a fuel flow rate control valve 15 for controlling the flow rate of the reforming material. According to the fifth embodiment, the second reforming material supply section 30 provided on the downstream side of the evaporation section 20 in the first to fourth embodiments is omitted. Instead, all of the reforming material are supplied in the first reforming material supply section 10 provided on the upstream side of the evaporation section 20.

FIG. 11 is an exploded perspective view showing the evaporation section 20 and the reforming section 40. As shown in FIG. 11, the evaporation section 20 and the reforming section 40 are provided with a rotary thermal storage (matrix) 201 for storing thermal energy, a pair of rest gas seals 22 for preventing gas leakage in slidable contact with the matrix 201, and a driving motor 23 for rotary driving the matrix 201. The rotary thermal storage 201 according to the fifth embodiment is formed by integrating into one body the evaporation section 20 and the reforming section 40 that are separately formed in each of the first to fourth embodiments.

The rotary thermal storage 201 according to the fifth embodiment has the evaporating section 20 on an upstream side (Lh side in FIG. 10) of the low temperature fluid passage A and the reforming section 40 on a downstream side (Lr side in FIG. 10) thereof.

The matrix 201 has a honeycomb structure having many through holes (cells) 201a along an axial direction formed therein. In the evaporation section 20, an oxidation catalyst (such as platinum, palladium, or a mixture thereof) is attached to (or supported on) each surface of the through holes 201a of the rotary thermal storage 201. A reforming catalyst (an element of nickel oxide, copper oxide, platinum, palladium or the like, or a mixture thereof) for reforming reaction is affixed on each surface of the through holes 201a of the rotary thermal storage 201.

In the rotary heat exchanger in which the reforming material is supplied to the low temperature fluid passage A on an upstream side of the evaporation section 20 as shown in the fifth embodiment, the reforming material is leaked from the low temperature fluid passage A to the high temperature fluid passage B. That is, there occur the transfer gas leakage due to the rotation of the rotary thermal storage 201 and the seal gas leakage due to the pressure difference between the low and high temperature fluid passages A and B. Accordingly, unreacted reforming material containing a harmful gas is exhausted together with exhaust gas to the outside.

To cope with this problem, the hydrogen supply device according to the fifth embodiment is provided in the high temperature fluid passage B on a downstream side of the rotary thermal storage 201 with an exhaust purification section 80 (exhaust purification means). A exhaust catalytic body 81 and an electric heater 82 (heating means) for heating the exhaust catalytic body 81 are provided in the exhaust purification section 80.

The exhaust catalytic body 81 has a honeycomb structure having many through holes and is formed of ceramic and metal material. An oxidation catalyst (such as platinum, palladium, or a mixture thereof) is affixed to (or supported on) each surface of the through holes of the exhaust catalytic body 81.

The electric heater 82 has a positive electrode 83 and a negative electrode 84 and generates heat when energized. An insulator 85 is disposed between the positive electrode 83 and a casing 1 for an insulating purpose. Since the catalyst affixed on the exhaust catalytic body 81 does not perform its catalytic function unless it reaches a given temperature for activation (for example, 200 to 300° C.), the exhaust catalytic body 81 is heated up by the electric heater 82 to become a temperature more than the given temperature for activation at a starting time of low temperature. During a normal driving operation time, the exhaust catalytic body 81 is maintained at the temperature more than the given temperature for activation by the high temperature fluid (gas) flowing in the high temperature fluid passage B.

An operation of the hydrogen supply device mentioned above is described hereinafter. At the starting time, a mixture of the actuation fuel and the air is ignited for flame combustion in the combustion chamber 76 of the combustion gas supply section 70. The combustion gas generated by the flame combustion flows through the rotary thermal storage 201 by running through the high temperature fluid passage B. Thereby, portions of the rotary thermal storage 201 located in the high temperature fluid passage B are heated by the combustion gas.

Air is supplied to the reforming material supply section 10. The portions of the rotary thermal storage 201 heated up by the combustion gas move to the low temperature fluid passage A due to the rotation of the rotary thermal storage 201 so that the air flowing in the low temperature fluid passage A is heated. Because the heated air flows in the low temperature fluid passage A, each component for this system is rapidly warmed up.

In the exhaust purification section 80, the exhaust catalytic body 81 is heated up on energizing the electric heater 82. The catalyst affixed on the exhaust catalytic body 81 is rapidly heated up to a temperature more than the given temperature for activation. The harmful gas contained in the combustion gas generated due to incomplete combustion at the combustion gas supply section 70 is purified when the harmful gas passes through the exhaust catalytic body 81. Accordingly, at the staring time of the hydrogen supply device, the combustion gas generated at the combustion gas supply section 70 is exhausted to the outside after the harmful gas contained therein is sufficiently purified.

After finishing the warming up of each element of the system, supply of the reforming material (a mixture of water, reforming fuel and air) starts in the reforming material supply section 10. The spray nozzle 13 in use of air stream atomizes the water and the reforming fuel, which are liquid, so that a mixture air stream containing fine particles of water and reforming fuel flows into the rotary thermal storage 201. In the evaporation section 20 on an upstream side of the rotary thermal storage 201, the reforming material is heated and vaporized by heat received from the high temperature fluid passage B. In the reforming section 40 on a downstream side of the rotary thermal storage 201, the reforming material is reformed due to a vapor steam reforming reaction or a simultaneous reforming (autothermal reforming) reaction using the vapor steam reforming reaction together with the partial oxidation reforming reaction to produce hydrogen rich gas.

In the evaporation section 20 and the reforming section 40, unreacted reforming fuel is leaked from the low temperature fluid passage A to the high temperature fluid passage B due to the transfer leakage caused by the rotation of the rotary thermal storage 201 and the seal leakage caused by pressure difference between the low and high temperature fluid passages A and B. In the Exhaust catalytic body 81 on a downstream side of the rotary thermal storage 201, an oxidation reaction of the unreacted reforming material (fuel gas such as HC, CO, methane and the like) and oxygen in the air is promoted so that the exhaust gas, in which harmful gas such as unburned gas is purified, is ejected to the outside.

The reformed gas produced in the reforming section 40 is supplied to the fuel cell 60. In the fuel cell 60, off gas containing unreacted hydrogen and off air containing unreacted oxygen are ejected. The off gas and the off air are introduced to the combustion gas supply section 70 where the off gas and the off air are mixed to form an off gas mixture. The off gas mixture is supplied to the reforming section 40 and the evaporation section 20 and is catalytically burned when passing through the rotary thermal storage 201. Reforming catalyst in the reforming section is directly heated by combustion heat thus produced. In the evaporation section 20, the combustion heat is stored in the rotary thermal storage 201 and serves to heat and vaporize the reforming material passing through the low temperature fluid passage A upon a rotating movement of the rotary thermal storage 201.

As such, each heating of the evaporation section 20 and the reforming section 40 is switched from heating by the flame combustion of the actuation fuel to heating by the off gas combustion, thus enabling to start self-driving of the hydrogen supply device. At a normal driving, the catalyst affixed on the exhaust catalytic body 81 is heated up to the temperature exceeding the activation temperature by high temperature gas passing through the high temperature fluid passage B so that heating by the electric heater 82 is not necessary.

With the structure according to the fifth embodiment, the evaporation section 20 and the reforming section 40 have a rotary thermal storage integrated into one body so that the device is more compact. Further, the reforming material supply section on the downstream side of the heat exchanger is abolished and the reforming fuel is supplied to the upstream side of the heat exchanger so that the device is more compact. Furthermore, the reforming material is directly heated by the heat exchanger so that the heat exchange efficiency is improved. Moreover, the exhaust purification section 80 is provided in the high temperature fluid passage B on the downstream side of the rotary thermal storage 201 so that, even if the reforming fuel is supplied to the upstream side of the rotary thermal storage, the harmful gas may not be exhausted to the outside.

(Sixth Embodiment)

Figure 12:
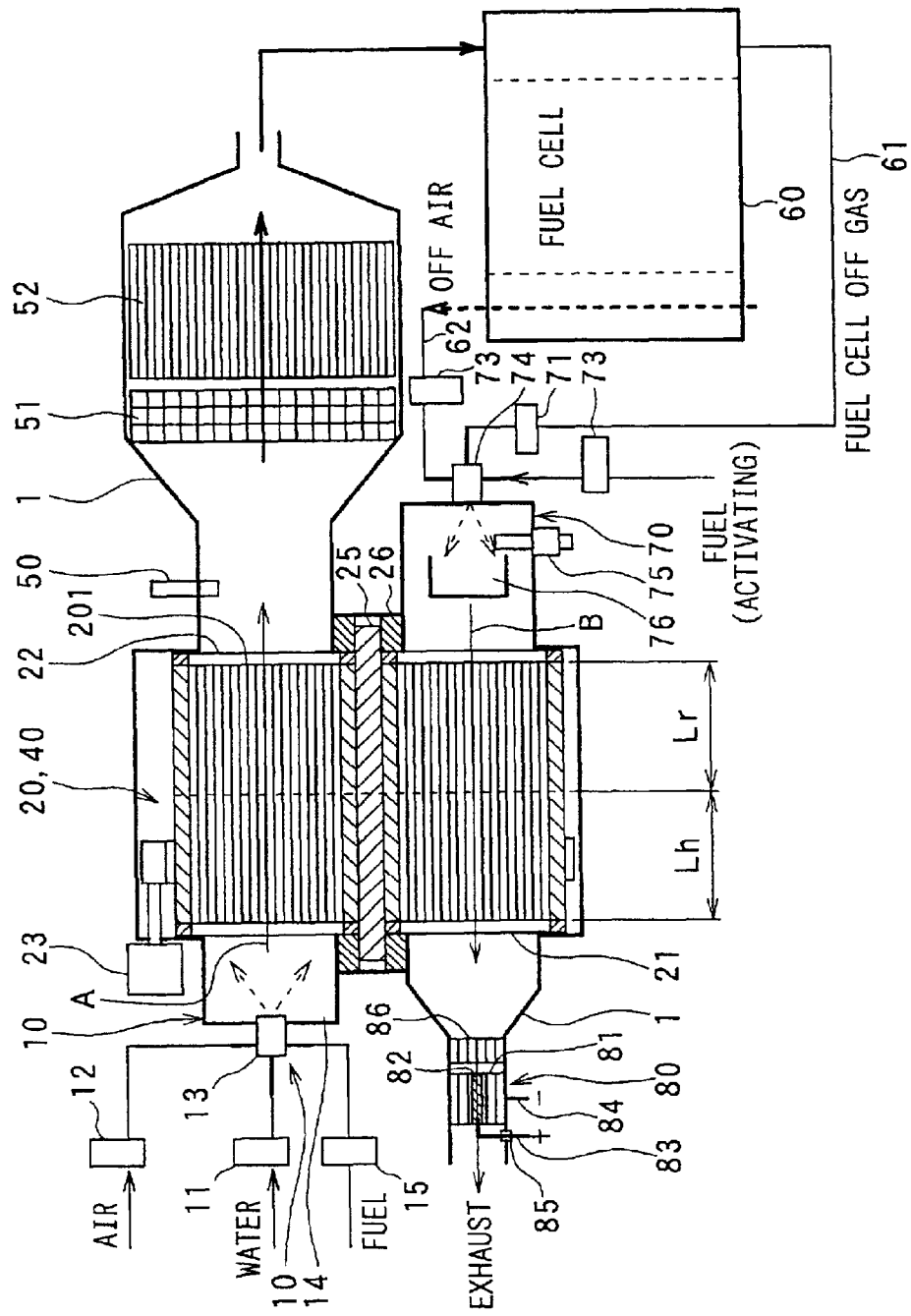
FIG. 12 is a conceptual diagram illustrating a general structure of the hydrogen supply device according to sixth embodiment.

Referring to FIG. 12, a sixth embodiment of the present invention will be described. When the sixth embodiment is compared to the above-described fifth embodiment, it is different in that an adsorbent 86 is provided in the exhaust purification section 80 on an upstream side of the exhaust catalytic body 81. Members similar to the above-described fifth embodiment will be denoted with the same reference numerals, and description thereof is omitted.

FIG. 12 is a conceptual diagram illustrating an arrangement of components of the hydrogen supply device according to the sixth embodiment. As shown in FIG. 12, the adsorbent 86 is provided in the exhaust purification section 80 on an upstream side of the exhaust catalytic body 81. The adsorbent 86 is provided with many through holes and minute holes for adsorbing. The adsorbent 86 is made of, for example, zeolite.

With the structure mentioned above, the hydrogen supply device operates at a starting time as described below. When the catalyst affixed on the exhaust catalytic body 81 is at low temperature immediately after starting and does not reach the activation temperature, the harmful components in the high temperature fluid passage B is adsorbed to the adsorbent 86. Then, the exhaust catalytic body 81 is heated by the electric heater 82 to the temperature exceeding the activation temperature.

When the adsorbent 86 is heated by combustion gas passing therethrough and reaches a given temperature, the harmful component adsorbed to the adsorbent 86 are dropped out from the adsorbent 86 so that the adsorbent 86 is regenerated. The harmful components dropped out from the adsorbent 86 are purified due to oxidation reaction by the exhaust catalytic body 81 that has been activated before being emitted to the outside.

As mentioned above, even if the catalyst affixed on the exhaust catalytic body 81 does not reaches the activation temperature, the harmful components are once held by the adsorbent 86 not to be emitted to the outside. Further, at high temperature, the harmful components are dropped out from the adsorbent 86 so that the adsorbent 86 is regenerated.

The electric heater 82 (heating means) provided in the exhaust purification section 80 may be omitted since the harmful components are held by the adsorbent 86 until the time when the catalyst affixed on the exhaust catalytic body 81 reaches the activation temperature the time.

Further, in the first to fourth embodiments, instead of integrating the rotating shafts of the rotary thermal storages 21 and 41 into one common rotating shaft, the rotary thermal storages 21 and 41 may have their own rotating shafts. In this case, each of the evaporation section 20 and the reforming section 40 needs its own driving mechanism such as a power motor so that the respective rotating speeds of the rotary thermal storages 21 and 22 are independently controlled according to the separately demanded heating temperatures in the evaporation section 20 and the reforming section 40.

Furthermore, in the fifth and sixth embodiments, instead of affixing the oxidation catalyst and the reforming catalyst on different surface portions of the rotary thermal storage 201, a catalyst mixture in which the oxidation catalyst and the reforming catalyst are mixed may be affixed on an entire surface of the rotary thermal storage 201.

Moreover, in the fifth and sixth embodiments, the catalyst affixed on the rotary thermal storage on the upstream side of the low temperature fluid passage may be omitted in such a manner that only heat transfer from the high temperature fluid passage B to the low temperature fluid passage A is allowed.

Further, the rotary thermal storage 201 in the fifth and sixth embodiments may be composed of a single rotary thermal storage or a plurality of rotary thermal storages that are stacked. For example, in a case of affixing the oxidation catalyst and the reforming catalyst on the different surface positions of the rotary thermal storage 201, after each of the oxidation catalyst and the reforming catalyst is affixed on each of two pieces of the rotary thermal storages, the rotary thermal storages are assembled to have an integrated structure.

Furthermore, in the mixing chamber 14, the water may be sprayed in gas phase or with liqudus particles.

(Seventh Embodiment)

Figure 13:
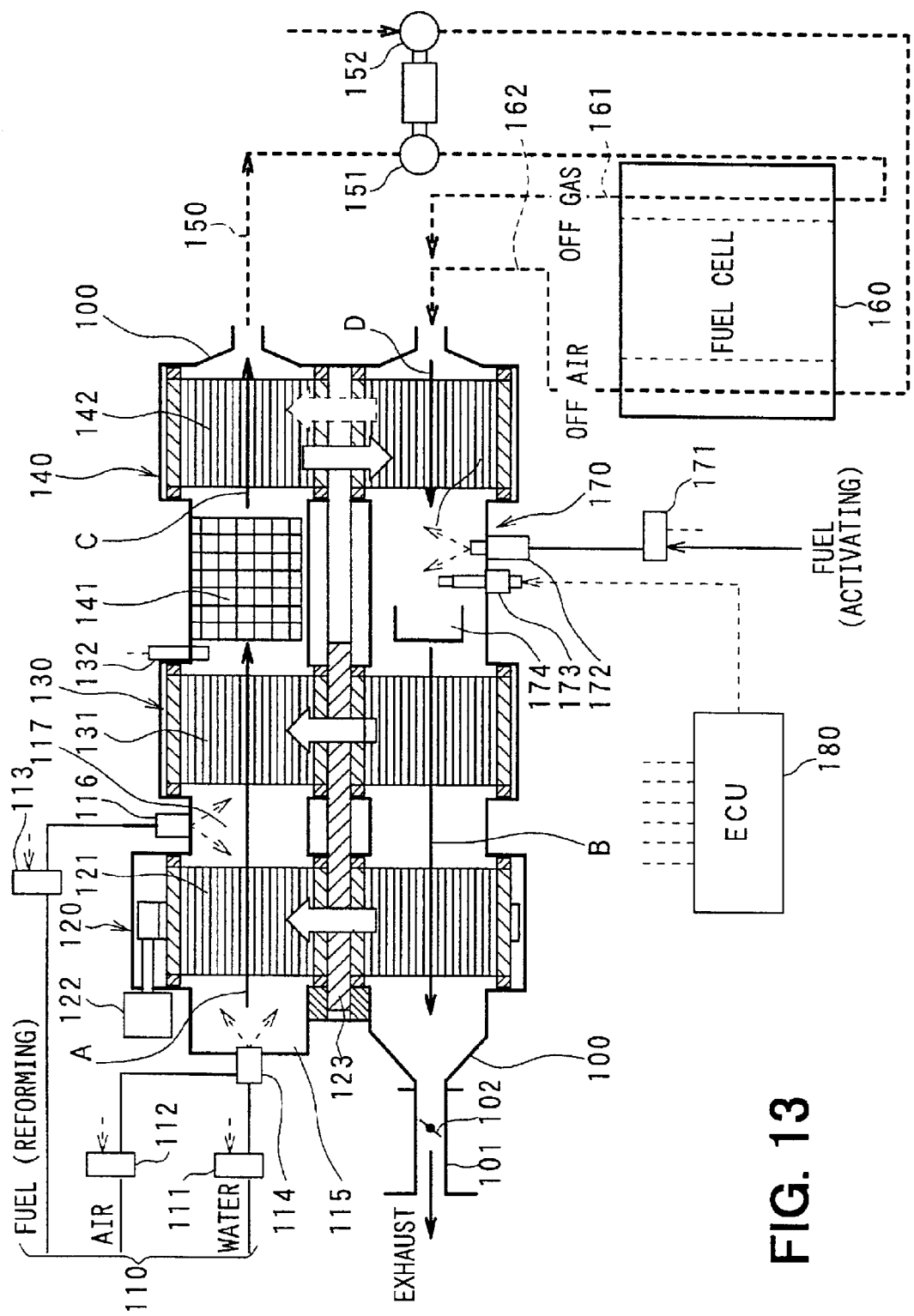
FIG. 13 is a conceptual diagram illustrating a general structure of a hydrogen supply device according to seventh embodiment.

Referring to FIG. 13, a seventh embodiment of the present invention will be described. FIG. 13 is a conceptual diagram illustrating an arrangement of components of the hydrogen supply device according to the seventh embodiment. A rigid line arrow mark illustrates a transfer direction of heat and a broken line arrow mark illustrates a transfer direction of moisture (vapor steam).

As shown in FIG. 13, the hydrogen supply device according to seventh embodiment includes a reforming material supply section 110, an evaporation section 120, a reforming section 130, a CO eliminating section 140, a gas compressor 151 (compressing means) and a combustion gas supply section 170. In the seventh embodiment, the evaporation section 120, the reforming section 130 and the CO eliminating section 140 are composed of rotary thermal storages.

Moreover, in the hydrogen supply device, a housing 100 forms a low temperature fluid passage A (a reforming material passage) for passing the reforming material and a high temperature fluid passage B (a combustion gas passage) for passing the combustion gas. The low temperature fluid passage A and the high temperature fluid passage B are parallel to each other. The low temperature fluid passage A and the high temperature fluid passage B are independent from each other, and the heat is exchanged through the evaporation section 120 and the reforming section 130.

The hydrogen supply device according to the seventh embodiment is provided on a downstream side of the low temperature fluid passage A with a reformed gas passage C for passing the reformed gas produced in the reforming section 130 and on an upstream side of the high temperature fluid passage B with an exhaust gas passage D for passing the exhaust gas emitted from a fuel cell 160. The reformed gas passage C and the exhaust gas passage D are parallel to and independent from each other. A. Heat is exchanged and moisture (vapor steam) is collected from the exhaust gas passage D to the reformed gas passage C through the CO eliminating section 140.

In the low temperature fluid passage A, first reforming material (a mixture of water and air) supplied from the first reforming material supply section 110 is heated and vaporized (evaporated) at the evaporation section 120. Second reforming material (fuel) is mixed with the vaporized first reforming material at a downstream side of the evaporation section 120 to form reforming material containing water, air and reforming fuel. The reforming material is reformed at the reforming section 130 to a reformed gas containing $H_2$ and CO. After CO is eliminated in the reformed gas passage C by the CO eliminating section 140, it is supplied as a hydrogen rich gas to the fuel cell 160. The moisture (vapor steam) necessary as specified material for the CO eliminating reaction in the CO eliminating section 140 is the moisture collected from the exhaust gas of the exhaust gas passage D.

To the fuel cell 160, the air (oxygen) is supplied along with hydrogen so that power is generated due to an electrochemical reaction of hydrogen and oxygen. In the fuel cell 160, off gas containing unreacted hydrogen that has not been used for power generation is emitted. Hydrogen and air to be supplied to the fuel cell 160 are moist and, further, moisture is produced by the electrochemical reaction in the fuel cell so that the exhaust gas emitted from the fuel cell 160 is moist and includes a large amount of vapor steam 160.

The exhaust gas emitted from the fuel cell 160 is supplied to the high temperature fluid passage B after the moisture (vapor steam) is collected in the exhaust gas passage D. In the high temperature fluid passage B, the off gas is supplied to the combustion gas supply section 170 so that the off gas is burned to become the combustion gas. The combustion heat of the off gas is transferred via the reforming section 130 and the evaporation section 20 from the high temperature fluid passage B to the reforming material flowing in the low temperature fluid passage A. In the present embodiment, liquid petroleum fuel such as gasoline and kerosene are used as the reforming fuel.

As shown in FIG. 13, the first reforming material supply section 110 for supplying the first reforming material (water and air) is placed at an upper-most stream part of the low temperature fluid passage A. The first reforming material supply section 110 is provided with a water flow rate control valve 111, an air flow rate control valve 112, a spray nozzle 114, and a mixing chamber 115. Air is supplied to the mixing chamber 115 by a drawing operation of the gas compressor 151 described later in detail.

On a downstream side of the mixing chamber 115 in the low temperature fluid passage A, the evaporation section 120 is disposed. The evaporation section 120 according to the seventh embodiment is a rotary type heat exchanger whose construction is similar to that of the first embodiment. The evaporation section 120 is provided with a rotary thermal storage 121 sandwiched by a pair of gas seals. On a downstream side of the evaporation section 120, there are provided a fuel flow rate control valve 113, a spray nozzle 116 and a mixing chamber 117, by which the second reforming material (reforming fuel) is mixed with and vaporized together with the vaporized first reforming material (the water and the air) passed through the evaporation section 120.

On a downstream side of the evaporation section 120, the reforming section 130 is provided. The reforming section 130 has a rotary thermal storage 131 similar to that of the evaporation section 120. A reforming catalyst is affixed on each surface of through holes of the rotary thermal storage 131. The reforming catalyst is heated in the reforming section 130 by combustion heat of the combustion gas flowing in the high temperature fluid passage B. On a downstream side of the reforming section 130, there is provided a temperature sensor 50 (temperature detection means) for indirectly detecting a temperature of the reforming catalyst.

On a downstream side of the reforming section 130, a CO eliminating section 140 for eliminating CO from the reformed gas is provided. In the CO eliminating section 140, a CO shift reaction ($CO+H_2O \rightarrow CO_2+H_2+CO$) and a CO oxidation reaction ($CO+\frac{1}{2}O_2 \rightarrow CO_2$) are performed so that CO in the reformed gas is eliminated. The CO shift reaction needs moisture for the CO elimination. On an upstream side of the CO eliminating section 140, there is provided a cooling section 141 for cooling the reformed gas to a require temperature for eliminating Co.

The CO eliminating section 140 has a rotary thermal storage 142 whose structure is similar to that of the evaporation section 120. The rotary thermal storage 142 of the CO eliminating section 140 crosses over both of the reformed gas passage C located on the downstream of the low temperature fluid passage A and the exhaust gas passage D located on the upstream side of the high temperature fluid passage B and alternatively moves between the reformed gas passage C and the exhaust gas passage D according to the rotation thereof.

Vapor steam adsorbing layers are formed on the surfaces (heat transfer surfaces) of the through holes of the rotary thermal storage 142 of the CO eliminating section 140. Each of the vapor steam adsorbing layers is a porous adsorbent made of, for example, zeolite or silica gel, which enables to adsorb moisture. The adsorbent is provided with many fine holes whose each size is defined so as to adsorb selectively the moisture.

In the CO eliminating section 140, CO purifying catalysts such as a shifting catalyst for the CO shift reaction (for example, Fe—Cr group catalyst or Cu—Zn group catalyst) and an oxidation catalyst for the oxidation reaction (for example, Pt, Pd or Rh) are affixed on the vapor steam adsorbing rayers.

The rotary thermal storages 121, 131 and 142 of the evaporation section 120, the reforming section 130 and the CO eliminating section 140 are arranged on a common rotating shaft 123 and simultaneously driven to rotate by a power motor 122 provided in the evaporation section 120.

In a reformed gas supply path 150 for supplying the reformed gas to the fuel cell 160, a push-in-type gas compressor 151 is provided. The gas compressor 151 is driven by a power motor. The gas compressor 151 changes a supply amount of the reforming material to the fuel cell 160 according to changes in an output demand for the fuel cell 160. By the intake of the gas compressor 151, the air is drawn and supplied to the reforming material supply section 110. In the gas compressor 151, pressure is higher at a discharge side than an intake side. Accordingly, pressure in the device is so adjustable that a pressure Pb of the high temperature fluid passage B is higher than a pressure Pa of the low temperature fluid passage A and a pressure Pd of the exhaust gas passage is higher than a pressure Pc of the reformed gas passage.

The reformed gas containing hydrogen produced in the hydrogen supply device is supplied to the fuel cell 160. To the fuel cell 160, the air (oxygen) is supplied along with hydrogen by the gas compressor 152 so that electric energy is generated due to an electrochemical reaction of hydrogen and oxygen.

In the fuel cell 160, it is necessary to have an electrolyte film inside the fuel cell 160 moist for promoting the electrochemical reaction for the power generation. Therefore, moist air and hydrogen are supplied to the fuel cell 160 at a normal driving time so that the fuel cell 160, whose inside is in a moist state, is effectively operated. Moisture is produced at a side of an Oxygen electrode due to the following electrochemical reaction;

(on a negative electrode side) $H_2 \rightarrow 2H^+ + 2e^-$
(on a positive electrode side) $2H^+ + \frac{1}{2}O_2 + 2e^- \rightarrow H_2O$ In the fuel cell 160, off gas containing unreacted hydrogen that has not been used for power generation and off air containing Oxygen that has not been used for power generation are emitted. The exhaust gas composed of the off gas and the off air, which includes a plenty of vapor steam (usually, in a saturated state), is supplied to the exhaust gas passage D via an off gas supply path 161 and a off air supply path 162.

In the high temperature fluid passage B on a downstream side of the exhaust gas passage D and on an upstream side of the reforming section 130, a combustion gas supply section 170 for heating the reforming section 130 and the evaporation section 120 is provided. The combustion gas supply section 170 is provided with a fuel flow rate control valve 171 (a combustion fuel supply section), a spray nozzle 172, an ignition plug 173 (igniting means), and a mixing/combustion chamber 174.

To the combustion gas supply section 170, the exhaust gas composed of the off gas passing through the exhaust gas passage D and the off air is supplied. The exhaust gas is supplied to the reforming section 130 and, then, to the evaporation section 120, and burned catalytically in the reforming and evaporation sections 130 and 120 having oxidation catalysts. The combustion heat of the combustion gas heats up the rotary thermal storages 131 and 121. The reforming catalyst of the rotary thermal storage 131 of the reforming section 130 is heated up and the rotary thermal storage 121 of the evaporation section 120 heats and vaporizes the reforming material in the low temperature fluid passage A.

When the hydrogen supply device is actuated at a starting time, instead of the off gas, an actuation fuel (the combustion fuel), whose flow rate is controlled by the fuel flow rate control valve 171, is sprayed to the combustion chamber 174, and is ignited by the ignition plug 173, thereby generating the combustion gas by flame combustion. In the seventh embodiment, a liquid petroleum type fuel similar to the reforming fuel, is used as the actuation fuel.

The downstream side of the evaporation section in the high temperature fluid passage B is provided a throttle tube 101 (a combustion gas exhaust path) and the throttle tube 101 is provided with an exhaust control valve 102 (pressure adjusting means) for altering a path area. With the gas compressor 151 and the exhaust control valve 102, pressure can be added to the high temperature fluid passage B and the exhaust gas passage D. Specifically, when the gas compressor is activated, the area of the combustion gas exhaust path 101 may be reduced by the exhaust control valve 102 so as to increase a resistance of the exhaust, thus increasing the pressure Pb of the high temperature fluid passage B and the pressure Pd of the exhaust gas passage D, compared to the pressure Pa of the low temperature fluid passage A and the pressure Pc of the reformed gas passage C, respectively.

The hydrogen supply device of the seventh embodiment includes a control section (ECU) 180, similar to that of the first embodiment, for performing various controls.

An activation of the hydrogen supply device having the above-described structure will be described below. First, actuation of the hydrogen supply device at the starting time will be described. In order to start the reforming reaction in the reforming section 130, it is necessary that the reforming material supplied to the reforming section 130 is evaporated and vaporized, and that a temperature of the reforming catalyst of the reforming section 130 is elevated to a predetermined temperature so as to be able to start the reforming reaction.

Then, in a combustion chamber 174 of the combustion gas supply section 170, the actuation fuel and the air are mixed to generate a fuel-air mixture, and then ignited by the ignition plug 173 for flame combustion. The combustion gas generated by the flame combustion flows through the reforming section 130 and the evaporation section 120 by running through the high temperature fluid passage B. Thereby, portions of the rotary thermal storages 131 and 121 located in the high temperature fluid passage B are heated by the combustion gas. At this time, air is supplied by operating the gas compressor 151 to the first reforming material supply section 110.

At the evaporation section 120, due to rotation of the rotary thermal storage 121, the portion which is heated by the combustion gas moves to the low temperature fluid passage A, thus causing the air flowing in the low temperature fluid passage A to be heated. Because the heated air flows in the low temperature fluid passage A, each component on the downstream side of the evaporation section 120 is rapidly warmed up. At the reforming section 130, the reforming catalyst provided in the rotary thermal storage 131, which rotates, is directly heated.

The combustion heat of the combustion gas rapidly warms up (i.e., pre-heats) each component of the reforming system such as the heat exchange section 120, the reforming section 130, and the CO eliminating section 140. Then, when a temperature of the reforming section 130 detected by the temperature sensor 132 reaches a predetermined temperature for starting the reforming reaction, it is identified that each temperature of components of the reforming system including the reforming catalyst has reached to the point where the reforming reaction can be initiated. Accordingly, the actuation fuel supplied in the combustion gas supply section 170 is ceased to stop the flame combustion. The predetermined temperature for starting the reforming reaction may be arbitrarily set according to a type of the reforming fuel and the like. When a petroleum type fuel is used as the reforming fuel as in seventh embodiment, the temperature may be set to about 300° C. to 400° C.

When warming up of each component is completed, the first reforming material supply section 110 starts supplying there forming material (the mixture of water and air). The first reforming material is heated and evaporated in the evaporation section 120 and, then, mixed with the second reforming material (reforming fuel) at the downstream side of the evaporation section 120 to form an evaporated reforming material composing of the water, the air and the reforming fuel. The evaporated reforming material is reformed in the reforming section 130 to the reformed gas containing $H_2$ and CO. CO of the reformed gas is eliminated in the CO eliminating section 140, and the reformed gas is supplied to the fuel cell 160 by the gas compressor 151.

In the fuel cell 160, a chemical reaction occurs between hydrogen and oxygen to generate power, and the off gas containing unreacted hydrogen and the off air containing unreacted oxygen are emitted. Since the inside of the fuel cell 160, in which the electrochemical reaction is performed, is in a moist state, the off gas and the off air containing a plenty of vapor steam are emitted. The off gas and the off air are introduced into the exhaust gas passage D through the off gas supply path 161 and the off air supply path 162, respectively. The pressure of the exhaust gas passage D is higher than the pressure of the reformed gas passage C and the temperature (about 100 to 120° C.) of the reformed gas is higher than that (about 80 to 90° C.) of the exhaust gas of the fuel cell 160.

Accordingly, the vapor stream contained in the exhaust gas of the fuel cell 160 is adsorbed to the vapor stream adsorbing layers of the rotary thermal storage 142 in the CO eliminating section on a side of the exhaust gas passage D having lower temperature and higher pressure. The portion of the rotary thermal storage 132 to which the vapor steam is adsorbed moves to the side of the reformed gas passage C as the rotary thermal storage 132 rotates and the vapor steam drops out of the vapor steam adsorbing layers in the reformed gas passage c having higher temperature and lower pressure. The vapor steam dropped is used for the CO shift reaction.

The CO eliminating reaction (shift reaction and oxidation reaction) in the CO eliminating section 140 generates heat. The rotary thermal storage 142 is heated to high temperature at the side of the reformed gas passage C and cooled at the side of the exhaust gas passage D, which prevents the catalyst from deteriorating so that an optimum reaction speed thereof is maintained.

The exhaust gas, from which the vapor steam has been collected by passing through the exhaust gas passage D, is introduced to the combustion gas supply section 170 of the high temperature fluid passage B. The exhaust gas is supplied to the reforming section 130 and to the evaporation section 120, and the catalytic combustion is initiated as it passes through the rotary thermal storages 131 and 121. The heat generated by the catalytic combustion of the off gas is stored in the rotary thermal storages 131 and 121. Thus, the rotary thermal storage 131 of the reforming section 130 directly heats up the reforming catalyst and the rotary thermal storage 121 of the evaporation section 120 heats up and vaporizes the reforming material passing through the low temperature fluid passage A.

As such, the heat generated by the catalytic combustion of the off gas heats up the reforming catalyst of the reforming section 130 and heats and evaporates the reforming material in the evaporation section 120. Accordingly, each heating of the evaporation section 120 and the reforming section 130 is switched from heating by the flame combustion of the actuation fuel to heating by the off gas combustion, thus enabling to start self-driving of the hydrogen supply device.

At this time, the pressure adjustment is conducted by adjusting the output of the gas compressor 151 and adjusting the opening degree of the exhaust control valve 102.

Next, when a load in the fuel cell 160 fluctuates, a supply amount of the reforming material is adjusted by the gas compressor 151 and an air compressor 152 according to the load fluctuation of the fuel cell 160 so as to adjust an amount of hydrogen and an amount of air that are supplied to the fuel cell 60. At that time, when an amount of the reformed gas supplied by the gas compressor 151 increases, the pressure Pb of the high temperature fluid passage B and the pressure Pd of the exhaust gas passage D become higher and, when decreases, they become lower. Accordingly, by adjusting the opening degree of the exhaust control valve 102, the respective pressure differences among the passages A, B, C and D are adjusted to be become adequate values.

In order to stop the supply of hydrogen from the hydrogen supply device to the fuel cell 160, supply of the reforming fuel and water is stopped first, and then the air supply is stopped. During that time, a combustible mixture gas remaining in the low temperature fluid passage A is burned completely within the evaporation section 120 in the high temperature fluid passage B or by the catalytic combustion on a surface thereof, thus suppressing an exhaust of emission.

As described above, the moisture necessary for CO eliminating reaction is collected from the exhaust gas emitted from the fuel cell 160 since the hydrogen supply device according to the seventh embodiment is provided with the rotary thermal storage 142 having the adsorbent in the CO eliminating section 140. As the moisture is supplied to the CO eliminating section 140, it is not necessary to add the moisture, whose amount exceeds a required amount for the reforming reaction, to the reforming material so that the evaporation and vaporization means of the hydrogen supply device is more compact.

Since the adsorbent, which adsorbs selectively specified material, is disposed on the surfaces of the through holes of the rotary thermal storage 142, not only the heat but also the specified material can be transferred between the two passages.

Further, since the rotary thermal storage 142 is provided with the vapor steam adsorbing layers an the shift catalyst, the vapor steam collected from the exhaust gas in the exhaust gas passage D, which is used in the CO eliminating reaction, can be transferred in a vapor steam state (without being phase changed into a liquid state) to the reformed gas passage C.

Furthermore, as the Co eliminating section 140 has the rotary thermal storage 142, the catalyst heated by the CO eliminating reaction in the reformed gas passage C can be cooled in the exhaust gas passage D. Accordingly, the catalyst is prevented from deteriorating so that the optimum reaction temperature thereof may be maintained.

The cooling section 141 disposed between the reforming section 130 and the CO eliminating section 140 may have a structure which heat changes via a heat medium with a cooling device (not shown) provided in the outside.

(Eighth Embodiment)

Figure 14:
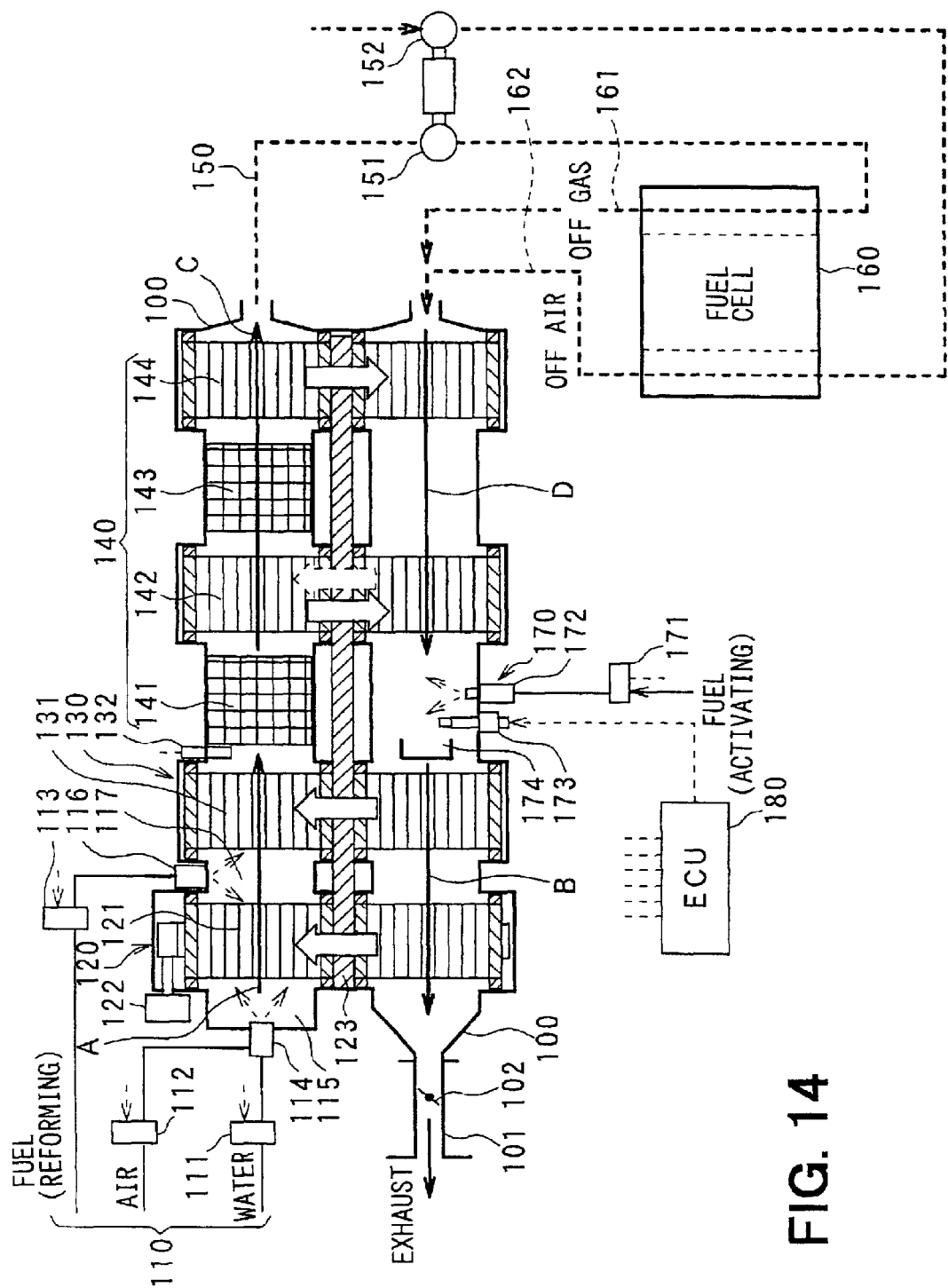
FIG. 14 is a conceptual diagram illustrating a general structure of a hydrogen supply device according to eighth embodiment.

Referring to FIG. 14, a eighth embodiment of the present invention will be described. FIG. 14 is a conceptual diagram illustrating an arrangement of components of the hydrogen supply device according to the eighth embodiment. As shown in FIG. 14, when the eighth embodiment is compared to the above-described seventh embodiment described above, it is different in a structure of the CO eliminating section 140. Members similar to the above-described seventh embodiment will be denoted with the same reference numerals, and description thereof is omitted.

As shown in FIG. 14, the CO eliminating section 140 is provided with first and second rotary thermal storages 142 and 144 each having a structure similar to that of the rotary thermal storage 121 of the evaporation section 120. The first rotary thermal storage 142 is located in the reformed gas passage C on an upstream side of the second rotary thermal storage 144 and in the exhaust gas passage D on a downstream side of the second rotary thermal storage 144. The first rotary thermal storage 142 serves to collect moisture (vapor stream) from the exhaust gas of the fuel cell flowing the exhaust gas passage D and the second rotary thermal storage 144 serves to perform CO eliminating reaction (shift reaction and oxidation reaction).

The first rotary thermal storage 142 is provided on surfaces (heat transfer surfaces) of through holes thereof with vapor steam adsorbing layers made of zeolite and the like.

The second rotary thermal storage 144 is provided on surfaces (heat transfer surfaces) of through holes thereof with CO eliminating catalyst (shift catalyst and oxidation catalyst). To cool the reformed gas whose temperature is high, a first cooling section 141 is disposed in the reformed gas passage C on an upstream side of the first rotary thermal storage 142 and a second cooling section 143 is disposed between the first and second rotary thermal storages 142 and 144.

With the structure mentioned above, the CO eliminating section 140 of the hydrogen supply device according to the eighth embodiment operates below.

In the first rotary thermal storage 142, the vapor steam is adsorbed and collected from the exhaust gas of the fuel cell flowing in the exhaust gas passage D at low temperature and under high pressure and transferred to the reformed gas passage C. The vapor steam adsorbed in the first rotary thermal storage 142 drops out in the reformed gas passage C at high temperature and under low pressure. At this time, in the first rotary thermal storage 142, heat of the reformed gas is radiated so that the reformed gas flowing the reformed gas passage C is cooled.

The vapor steam dropped out of the first rotary thermal storage 142 in the reformed gas passage C is supplied to the second rotary thermal storage 144. In the second rotary thermal storage 144, CO eliminating reaction in use of the vapor steam is promoted so that CO in the reformed gas is eliminated. At this time, though the second rotary thermal storage 144 is heated due to the CO eliminating reaction, the catalyst can be cooled in the exhaust gas passage D at low temperature.

The hydrogen supply device according to the eighth embodiment has the same advantage as the seventh embodiment. Further, since the CO eliminating section 140 has two rotary thermal storages 142 and 144 so that the moisture collection and the CO eliminating reaction are separately performed, an adsorbing efficiency of moisture (vapor steam) is improved.

According to the eighth embodiment, though the moisture is collected in the first rotary thermal storage 142 and the CO elimination (shift reaction and oxidation reaction) is performed in the second rotary thermal storage 144, the shift reaction and the oxidation reaction may be performed separately. In this case, both of the moisture collection and the shift reaction are performed in the first rotary thermal storage 142 and only the oxidation reaction is performed in the second rotary thermal storage 144. The shift catalyst is provided only in the first rotary thermal storage 142.

(Ninth Embodiment)

Figure 15:
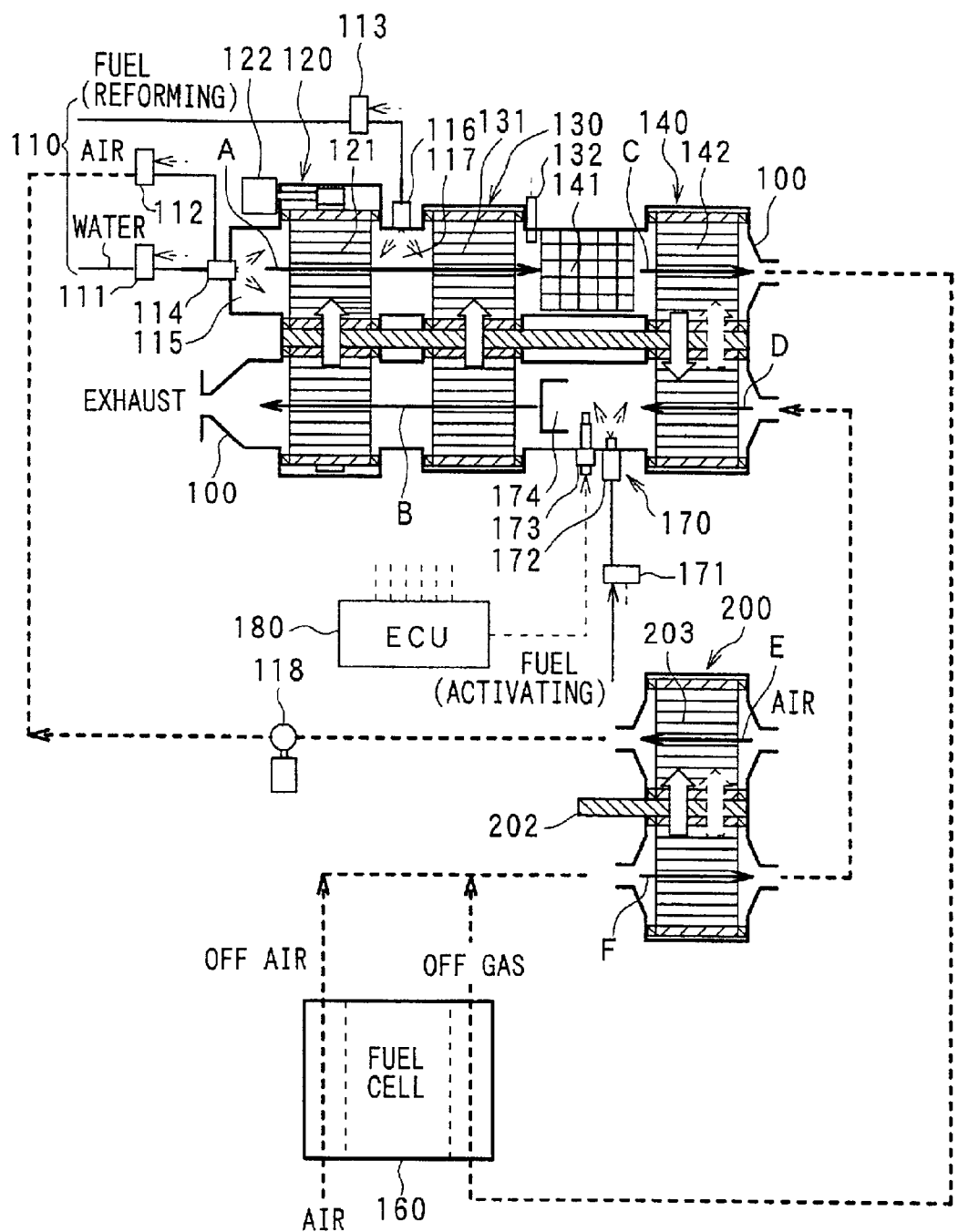
FIG. 15 is a conceptual diagram illustrating a general structure of a hydrogen supply device according to ninth embodiment.

Referring to FIG. 15, a ninth embodiment of the present invention is described. FIG. 15 is a conceptual diagram illustrating an arrangement of components of the hydrogen supply device according to the ninth embodiment. As shown in FIG. 15, when the ninth embodiment is compared to the above-described seventh embodiment described above, it is different in that are forming air moistening section 200 is added. Members similar to the above-described seventh embodiment will be denoted with the same reference numerals, and description thereof is omitted.

As shown in FIG. 15, the hydrogen supply device according to the ninth embodiment is provided with the reforming air moistening section 200 for moistening air of the reforming material. The reforming air moistening section 200 is provided with a reforming air passage E through which reforming air passes and an air moistening exhaust gas passage F through which the exhaust gas emitted from the fuel cell 160 passes. Air passing through the reforming air passage E is supplied to the reforming material supply section 110 and used as a part of the reforming material. The exhaust gas passing through the air moistening exhaust gas passage F id supplied to the exhaust gas passage D.

A gas compressor 118 for delivering air under pressure is provided in the reforming air moistening section 200 between the reforming air passage E and the reforming material supply section 110. Accordingly, pressure of the reforming air passage E on an intake side of the gas compressor 118 in the reforming air moistening section 200 is lower.

The reforming air moistening section 200 has a rotary thermal storage 203 whose structure is similar to that of the rotary thermal storage 121 of the evaporation section 120. The rotary thermal storage 203 is provided on surfaces (heat transfer surfaces) of through holes thereof with vapor steam adsorbing layers made of zeolite and the like. The rotary thermal storage 203 is driven to rotate about a rotating shaft 202 thereof by a drive mechanism (not shown).

With the structure mentioned above, in the reforming air moistening section 200, the vapor steam is adsorbed and collected from the exhaust gas emitted from the fuel cell 160 in the air moistening exhaust gas passage F and dropped out in the reforming air passage E. Since the pressure of the reforming air passage E is lower than that of the air moistening exhaust gas passage F, while temperature difference between the air moistening exhaust gas passage F and the reforming air passage E is small, the vapor steam in the air moistening exhaust gas passage F is transferred by adsorbing to the reforming air passage E. The exhaust gas passing through the air moistening exhaust gas passage F is supplied to the exhaust passage D and, after moisture is further collected, used as combustion gas in the high temperature fluid passage B.

According to the ninth embodiment mentioned above, the vapor steam is collected from the exhaust gas of the fuel cell 160 and the air to be used as the reforming material is moistened, a water supply device of the reforming material supply section 110 is more compact or may be eliminated.

The vapor steam collected in the reforming air moistening section 200 is transferred in a vapor steam state to the reforming material supply section 110. Accordingly, it is preferable that, in the reforming air moistening section 200, a path between the reforming air passage E and the reforming material supply section 110 has a heat insulating structure. Further, the path between the reforming air passage E and the reforming material supply section 110 may be heated by the combustion gas emitted from the hydrogen supply device on a downstream side of the high temperature fluid passage B.

(Tenth Embodiment)

Figure 16:
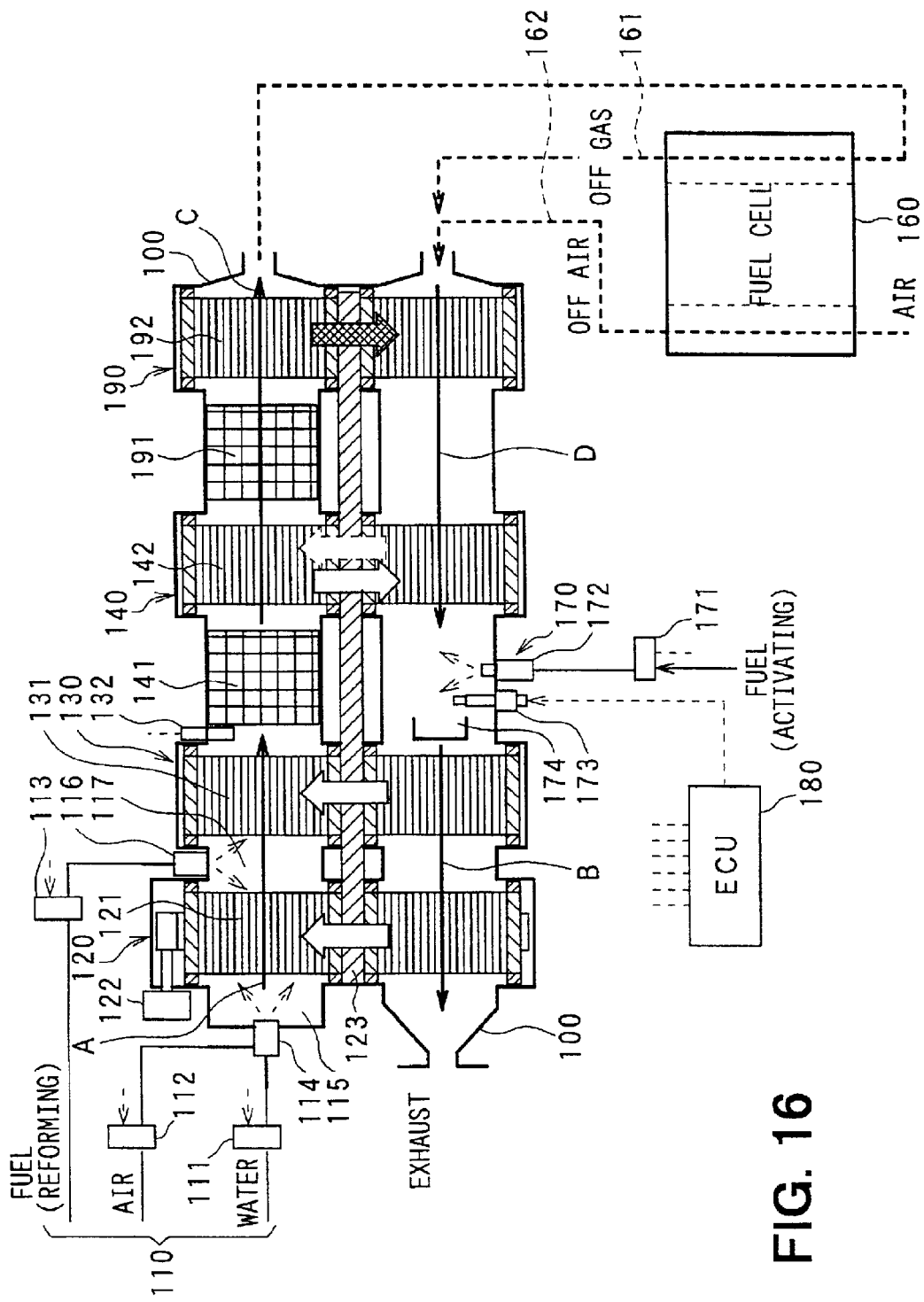
FIG. 16 is a conceptual diagram illustrating a general structure of a hydrogen supply device according to tenth embodiment.

Referring to FIG. 16, a tenth embodiment of the present invention will be described. FIG. 19 is a conceptual diagram illustrating an arrangement of components of the hydrogen supply device according to the tenth embodiment. As shown in FIG. 16, when the tenth embodiment is compared to the above-described seventh embodiment described above, it is different in that an impurity eliminating section 190 for adsorbing and eliminating impurities other than hydrogen (such as nitrogen, carbon dioxide and so on) contained in the reformed gas is provided. Members similar to the above-described seventh embodiment will be denoted with the same reference numerals, and description thereof is omitted. A cross-hatched arrow mark illustrates a transfer direction of the impurities.

In the reforming section 130, hydrogen, carbon monoxide and carbon dioxide are produced by reforming the reforming material (a mixture of water, air and reforming fuel) due to the reforming reaction. Nitrogen is contained in air included in the reforming material. Accordingly, the impurities other than hydrogen are included in the reformed gas so that a hydrogen density is low.

As shown in FIG. 16, the hydrogen supply device according to the tenth embodiment is provided in the reformed gas passage C on a downstream side of the CO eliminating section 140 with the impurity eliminating section 190 for adsorbing and eliminating impurities other than hydrogen (nitrogen, carbon dioxide and so on) contained in the reformed gas.

The impurity eliminating section 190 has a rotary thermal storage 191 whose structure is similar to that of the rotary thermal storage 121 of the evaporation section 120. The rotary thermal storage 191 is provided on surfaces (heat transfer surfaces) of through holes thereof with impurity adsorbing layers. The impurity adsorbing layers are made of porous zeolite and have many fine holes on surfaces thereof.

In the impurity adsorbing layers, specified impurities are selectively adsorbed by setting dimensions of the fine holes to given values corresponding to molecule sizes of the respective specified impurities. Main impurities in the reformed gas in the tenth embodiment are nitrogen and the carbon monoxide.

The hydrogen supply device according to the tenth embodiment is provided in the reforming material supply section 110 on an upstream side of the air flow rate control valve 112 with a push-in type gas compressor (not shown). Accordingly, in the exhaust gas passage D located on a down stream side of the reformed gas passage C, there occurs a pressure loss so that the pressure Pd of the exhaust gas passage D is lower than the pressure Pc of the reformed gas passage C.

With the structure mentioned above, the impurity eliminating section 190 operates below. The reformed gas is supplied to the impurity eliminating section 190 after carbon monoxide is eliminated in the Co eliminating section 140 in the reformed gas passage C. In the impurity eliminating section 190, the impurity adsorbing layers physically adsorb selectively nitrogen and carbon dioxide contained in the reformed gas. Since the pressure of the exhaust gas passage D is lower than that of the reformed gas passage C, while temperature difference between the reformed gas passage C and the exhaust gas passage D is small, the impurities in the reformed gas passage C is transferred by adsorbing to the exhaust gas passage.

Then, the portion of the rotary thermal storage 191 to which nitrogen and so on are adsorbed moves to a side of the exhaust gas passage D due to the rotation thereof. Nitrogen and so on adsorbed to the impurity adsorbing layers are dropped out and ejected together with the exhaust gas to the outside of the hydrogen supply device.

According to the impurity eliminating section 190 of the tenth embodiment, since the nitrogen and the carbon dioxide are physically adsorbed selectively, dropped out on the side of the exhaust gas passage D and ejected to the outside so that a hydrogen density in the reformed gas to be supplied to the fuel cell 160 becomes higher. As a result, a power generation efficiency of the fuel cell 160 is improved.

The impurity eliminating section 190 may be provided in the reformed gas passage C on an upstream side of the CO eliminating section 140. It is preferable, however, that the impurity eliminating section 190 is provided in the reformed gas passage C on downstream side of the CO eliminating section 140, since carbon dioxide is produced due to the CO eliminating reaction in the CO eliminating section 140.

Further, as the impurities are eliminated from the reformed gas whose temperature becomes low after the CO eliminating reaction, an adsorbing efficiency of the adsorbent is higher.

The rotary thermal storage described in the embodiments mentioned above may be applied to a device other than the hydrogen supply device, for example, a gas turbine.

What is claimed is:

1. A hydrogen supply device for producing and supplying hydrogen to a hydrogen consumption device, comprising:
   a low temperature fluid passage;
   a high temperature fluid passage;
   a first rotary thermal storage through which the low and high temperature passages pass, the first rotary thermal storage being driven to rotate;
   a reforming material supply section for supplying reforming material to the low temperature fluid passage on an upstream side of the first rotary thermal storage; and
   a combustion gas supply section for generating and supplying a combustion gas to the high temperature fluid passage on an upstream side of the first rotary thermal storage,
   wherein the first rotary thermal storage rotates to move alternately between the low and high temperature fluid passages so that the first rotary thermal storage constitutes a reforming section for catalytically reforming the reforming material flowing in the low temperature fluid passage to a reformed gas containing hydrogen upon receiving combustion heat of the combustion gas flowing in the high temperature fluid conduit.

2. A hydrogen supply device according to claim 1, further comprising;
   a pair of first flanges disposed on opposite axial end sides of the first rotary thermal storage, each of the first flanges being divided into two regions one of which communicates with the high temperature fluid passage and the other one of which communicates with the low temperature fluid passage,
   wherein the first rotary thermal storage is provided inside with a plurality of first through holes extending axially so that the combustion gas flowing in the high temperature fluid passage passes through the first through-holes whose opening ends face to the one of two regions of the first flange and the reforming material flowing in the low temperature fluid passage passes through the first through-holes whose opening ends face to the other one of two regions of the first flange.

3. A hydrogen supply device according to claim 2, wherein the first rotary thermal storage is provided on surfaces of the first through holes with reforming catalyst.

4. A hydrogen supply device according to claim 3, further comprising;
   an off gas supply path through which off gas containing hydrogen that is not sufficiently consumed in the hydrogen consumption device is supplied from the hydrogen consumption device to the combustion gas supply section so that the combustion gas is produced by burning the off gas.

5. A hydrogen supply device according to claim 1, wherein the combustion gas supply section is provided with a combustion fuel supply section for supplying combustion fuel and igniting means for igniting the combustion fuel to produce the combustion gas.

6. A hydrogen supply device according to claim 1, further comprising;
   a second rotary thermal storage through which the low temperature fluid passage on an upstream side of the first rotary thermal storage and the high temperature fluid passage on a downstream side of the first rotary thermal storage pass, the second thermal storage being driven to rotate,
   wherein at least a part of the reforming material is supplied to the low temperature fluid passage on an upstream side of the second rotary thermal storage and the second rotary thermal storage rotates to move alternately between the low and high temperature fluid passages so that the second rotary thermal storage constitutes an evaporation section for heating and vaporizing the at least a part of the reforming material flowing in the low temperature fluid passage, to which the combustion heat of the combustion gas flowing in the high temperature fluid passage is transferred.

7. A hydrogen supply device according to claim 6, further comprising;
   a pair of second flanges disposed on opposite axial end sides of the second rotary thermal storage, each of the second flange being divided into two regions one of which communicates with the high temperature fluid passage and the other one of which communicates with the low temperature fluid passage,
   wherein the second rotary thermal storage is provided inside with a plurality of second through holes extending axially so that the combustion gas flowing in the high temperature fluid passage passes through the second through-holes whose opening ends face to the one of two regions of the second flange and the reforming material flowing in the low temperature fluid passage passes through the second through-holes whose opening ends face to the other one of two regions of the second flange.

8. A hydrogen supply device according to claim 7, wherein the second rotary thermal storage is provided on surfaces of the second through holes with oxidation catalyst.

9. A hydrogen supply device according to claim 6, wherein rotating speeds of the first and second rotary thermal storages are adjusted to secure required heating temperatures.

10. A hydrogen supply device according to claim 6, wherein the first and second rotary thermal storages have an identical rotating shaft.

11. A hydrogen supply device according to claim 6, wherein the evaporation section is disposed in the high temperature fluid passage on a downstream side of the reforming section.

12. A hydrogen supply device according to claim 6, wherein the reforming material comprises a first reforming material containing at least water and a second reforming material containing at least hydride compound and, further, wherein the reforming material supply section comprises a first reforming material supply section in which the first reforming material is supplied to the low temperature fluid passage on an upstream side of the evaporation section and a second material supply section in which the second reforming material is supplied to the low temperature fluid passage on a downstream side of the evaporation section and mixed with the first reforming material to form the reforming material between the evaporation and reforming sections.

13. A hydrogen supply device according to claim 1, wherein the first rotary thermal storage is a common rotary thermal storage constituting not only the reforming section but also an evaporation section for heating and vaporizing the reforming material flowing in the low temperature fluid passage, to which the combustion heat of the combustion gas flowing in the high temperature fluid passage is transferred.

14. A hydrogen supply device according to claim 13, further comprising;
   a pair of common flanges disposed on opposite axial end sides of the common rotary thermal storage, each of the common flange being divided into two regions one of which communicates with the high temperature fluid passage and the other one of which communicates with the low temperature fluid passage,
   wherein the common rotary thermal storage is provided inside with a plurality of common through holes extending axially so that the combustion gas flowing in the high temperature fluid passage passes through the common through-holes whose opening ends face to the one of two regions of the common flange and the reforming material flowing in the low temperature fluid passage passes through the common through-holes whose opening ends face to the other one of two regions of the common flange.

15. A hydrogen supply device according to claim 13, wherein a portion of the common rotary thermal storage on an upstream side of the low temperature fluid passage corresponds to the evaporation section and a portion of the common rotary thermal storage on a downstream side of the low temperature fluid passage corresponds to the reforming section.

16. A hydrogen supply device according to claim 15, wherein the portion of the common rotary thermal storage on a downstream side of the low temperature fluid passage is provided with reforming catalyst affixed thereto.

17. A hydrogen supply device according to claim 15, wherein the portion of the common rotary thermal storage on an upstream side of the low temperature fluid passage is provided with oxidation catalyst affixed thereto.

18. A hydrogen supply device according to claim 1, wherein the first rotary thermal storage is a common rotary thermal storage, and an evaporation section is formed in the common rotary thermal storage in addition to the reforming section.

19. A hydrogen supply device according to claim 18, further comprising a mixture of catalyst containing reforming catalyst and oxidation catalyst, wherein the mixture of catalyst is provided in the common rotary thermal storage.

20. A hydrogen supply device according to claim 13, further comprising:
   an exhaust purification section disposed in the high temperature fluid passage on a downstream side of the common rotary thermal storage.

21. A hydrogen supply device according to claim 20, wherein the exhaust purification section is an exhaust purification body having a plenty of exhaust through holes and oxidation catalyst affixed to surfaces of the exhaust through holes.

22. A hydrogen supply device according to claim 21, wherein the exhaust purification section is provided with heating means for heating the exhaust purification body.

23. A hydrogen supply device according to claim 21, wherein the exhaust purification section is provided on an upstream side of the exhaust purification body with an adsorbent.

24. A hydrogen supply device according to claim 1, further comprising:
   a second rotary thermal storage through which the low temperature fluid passage on an upstream side of the first rotary thermal storage and the high temperature fluid passage on a downstream side of the first rotary thermal storage pass, the second rotary thermal storage being provided inside with a plurality of second through holes, so that the combustion gas flowing in the high temperature fluid passage passes through one part of the second through holes, while reforming material flowing in the low temperature fluid passage passes through another part of the second through holes;
   a reformed gas passage through which the reformed gas produced in the reforming section passes;
   an exhaust gas passage through which exhaust gas containing hydrogen that is not sufficiently consumed in the hydrogen consumption device passes; and
   a third rotary thermal storage having a plenty of third through holes through which the reformed gas and exhaust gas passages pass, the third rotary thermal storage being driven to rotate and being provided on surfaces of the third through holes with adsorbent for adsorbing at least one of specified material contained in the reformed gas and the off gas,
   wherein the third rotary thermal storage rotates to move alternately between the reformed gas and the exhaust gas passages so that the at least one of specified material adsorbed to the adsorbent in one of the reformed gas and exhaust gas passages drops out of the adsorbent in the other one of the reformed gas and exhaust gas passages.

25. A hydrogen supply device according to claim 24, wherein the third rotary thermal storage constitutes a CO eliminating section for catalytically eliminating CO from the reformed gas flowing in the reformed gas passage.

26. A hydrogen supply device according to claim 25, wherein the CO eliminating section is provided with CO eliminating catalyst for converting CO into $CO_2$, the CO eliminating catalyst being affixed to the surfaces of the third through holes.

27. A hydrogen supply device according to claim 25, wherein the at least one of specified material is moisture contained in the exhaust gas flowing in the exhaust gas passage so that the moisture that dropped out of the adsorbent in the reformed gas passage is catalytically reacted with CO contained in the reformed gas due to shift reaction.

28. A hydrogen supply device according to claim 24, further comprising;
   a CO eliminating section for eliminating CO from the reformed gas flowing in the reformed gas passage, the CO eliminating section having catalyst for catalytically converting CO into $CO_2$ and being disposed in the reformed gas passage on a downstream side of the third rotary thermal storage.

29. A hydrogen supply device according to claim 24, wherein pressure of the exhaust gas passage is higher than pressure of the reformed gas passage.

30. A hydrogen supply device according to claim 24, wherein the specified material are nitrogen and carbon dioxide contained in the reformed gas flowing in the reformed gas passage.

31. A hydrogen supply device according to claim 30, wherein pressure of the reformed gas passage is higher than pressure of the exhaust gas passage.

32. A hydrogen supply device according to claim 1, wherein the reforming material contains at least reforming air and reforming fuel having hydride component, further comprising:
   a reforming air passage through which the reforming air passes;
   an air moistening exhaust gas passage through which exhaust gas containing hydrogen that is not sufficiently consumed in the hydrogen consumption device passes;

an additional rotary thermal storage having plenty of through holes through which the reforming air passage and the air moistening exhaust gas passage pass, the additional rotary thermal storage being driven to rotate and being provided on surfaces of the through holes with water adsorbent for adsorbing moisture, wherein the additional rotary thermal storage rotates to move alternately between the reforming air passage and the air moistening exhaust gas passage so that the additional rotary thermal storage constitutes a reforming air moistening section in which moisture adsorbed to the water adsorbent in the air moistening exhaust gas passage drops out of the water adsorbent in the reforming air passage for reusing as the reforming air.

33. A hydrogen supply device according to claim 32, wherein pressure of the air moistening exhaust gas passage is higher than pressure of the reforming air passage.

34. A hydrogen supply device according to claim 1, wherein the hydrogen consumption device is a fuel cell.

* * * * *